(12) United States Patent
Kako et al.

(10) Patent No.: US 6,417,470 B2
(45) Date of Patent: *Jul. 9, 2002

(54) KEY TOP GUIDED BY SCISSORS LINKAGE LOCATED IN MOUNTING MEMBER WITH CHIPPED CONFIGURATION DISPOSED ON SUPPORT PLATE

(75) Inventors: Mitsumasa Kako, Tokai; Isao Mochizuki, Gifu-ken, both of (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/915,262

(22) Filed: Jul. 27, 2001

Related U.S. Application Data

(62) Division of application No. 09/391,159, filed on Sep. 8, 1999, now Pat. No. 6,288,457.

(30) Foreign Application Priority Data

| Sep. 10, 1998 | (JP) | 10-256286 |
| Dec. 18, 1998 | (JP) | 10-360555 |
| Feb. 10, 1999 | (JP) | 11-032608 |

(51) Int. Cl.[7] ............................................. H01H 13/70
(52) U.S. Cl. ...................................................... 200/344
(58) Field of Search ................................ 200/5 A, 5 R, 200/341–345, 344; 345/156–169; 341/22–35; 361/680–682, 679

(56) References Cited

U.S. PATENT DOCUMENTS

| 4,876,441 | A | 10/1989 | Hara et al. .............. 361/680 X |
| 5,382,762 | A | 1/1995 | Mochizuki .............. 200/344 X |
| 5,463,195 | A | 10/1995 | Watanabe et al. ....... 200/344 X |
| 5,466,901 | A | 11/1995 | Mochizuki .............. 200/344 X |
| 5,504,283 | A | 4/1996 | Kako et al. ................. 200/5 A |
| 5,735,390 | A | 4/1998 | Takagi et al. .............. 200/344 |
| 5,767,464 | A | 6/1998 | Dyer et al. ............. 200/344 X |
| 5,769,210 | A | 6/1998 | Tsai .......................... 200/344 |
| 5,799,772 | A | 9/1998 | Sanda et al. ............ 200/344 X |
| 5,874,696 | A | 2/1999 | Hayashi et al. ......... 200/345 X |
| 6,072,133 | A | 6/2000 | Takagi et al. |
| 6,288,457 | B1 * | 9/2001 | Kako et al. ............. 200/344 X |

FOREIGN PATENT DOCUMENTS

| JP | 2-5236 | 1/1990 |
| JP | 2589927 | 11/1998 |

* cited by examiner

Primary Examiner—J. R. Scott
(74) Attorney, Agent, or Firm—Oliff & Berridge, PLC

(57) ABSTRACT

In a key switch device 3, a guide member 10 constructed of a first and a second links 14 and 15, which guides a vertical movement of a key top 9, is movably mounted on a support plate 2 with a mounting member 6 provided with a rotatably supporting portion 7 which rotatably supports a rotatable shaft 18 formed at a lower end of the first link 14 and a slidably supporting portion 8 which slidably supports a slidable shaft 20 formed at a lower end of the second link 15. The mounting member 6 is fixed on the support plate 2 with a first, second, and third adhesive layers 24, 25, and 26.

10 Claims, 23 Drawing Sheets

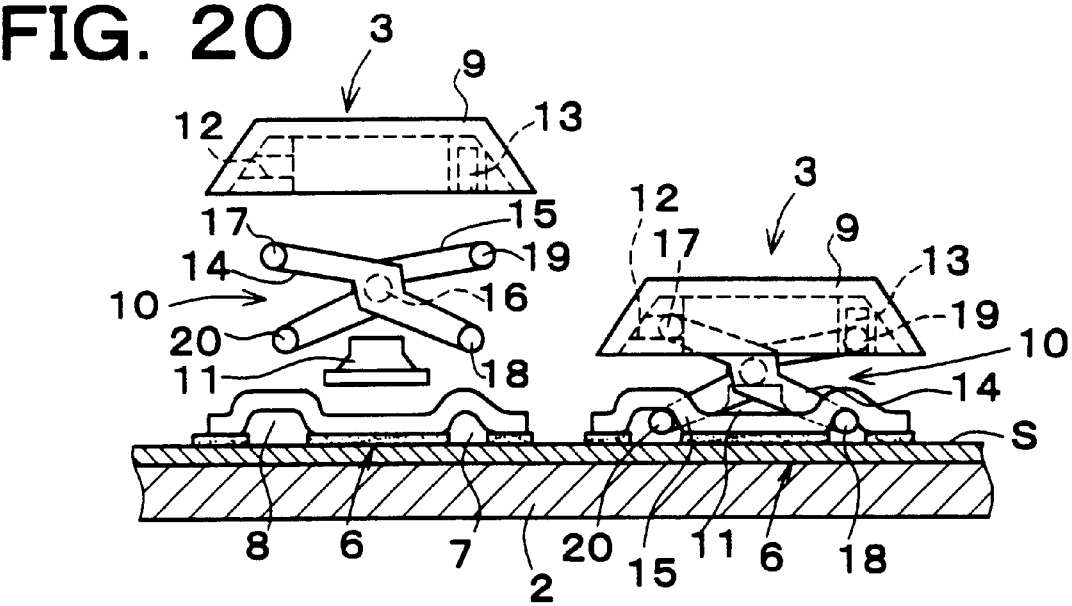
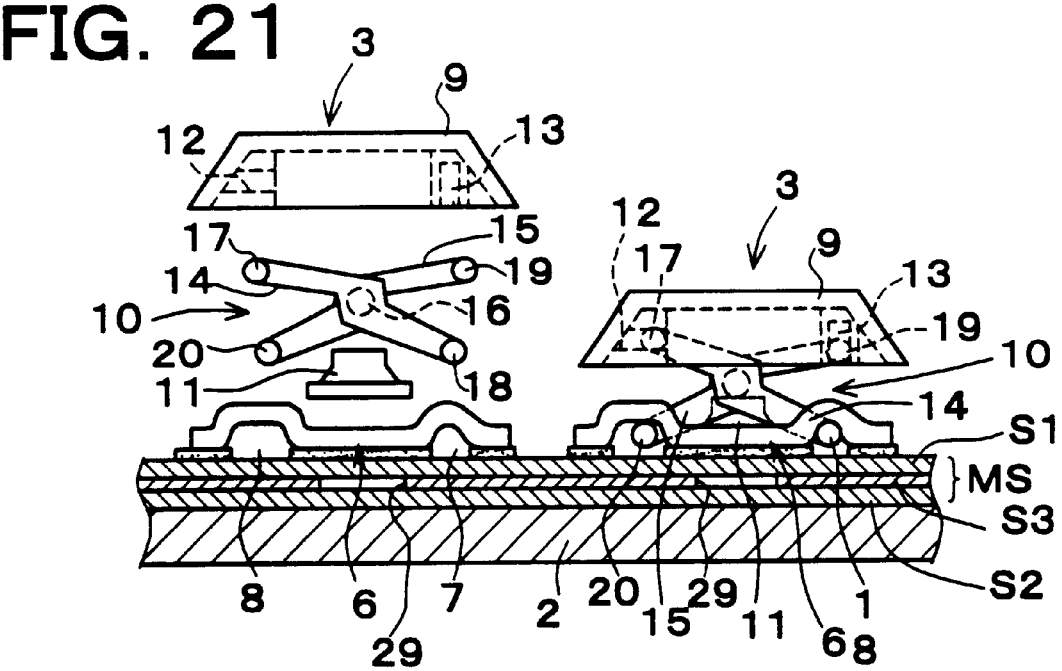

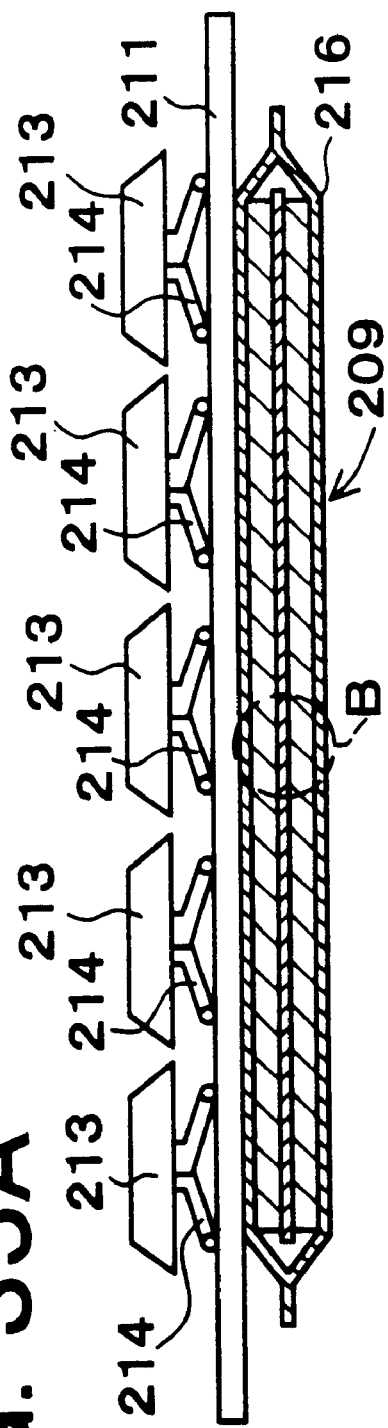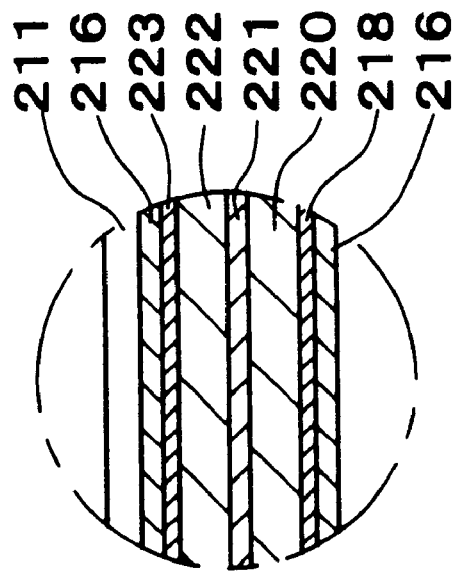
FIG. 35A
FIG. 35B

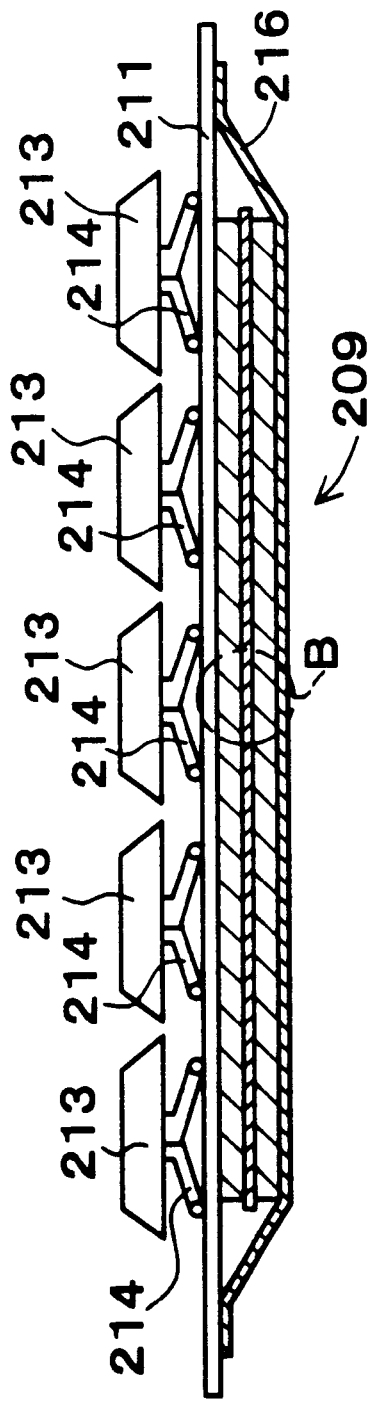
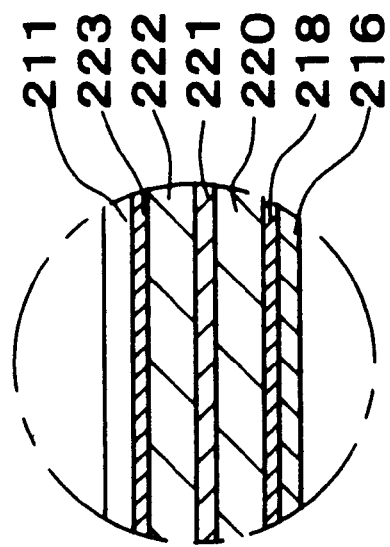
FIG. 37(A)
FIG. 37(B)

KEY TOP GUIDED BY SCISSORS LINKAGE LOCATED IN MOUNTING MEMBER WITH CHIPPED CONFIGURATION DISPOSED ON SUPPORT PLATE

This is a divisional of application Ser. No. 09/391,159, now U.S. Pat. No. 6,288,457 B1 filed Sep. 8, 1999. The entire disclosure of the prior Application is hereby incorporated by reference therein in its entirety.

BACKGROUND OF THE INVENTION

1. Field of the Invention

Furthermore, the present invention relates to a key switch device having a film sheet for performing a switching operation, the film sheet being disposed below a key top, and mounting members for movably supporting each lower end of two link members of a guide member, the mounting members being fixed on the film sheet, which can reduce manufacturing cost and increase design flexibility of a keyboard provided with a plurality of the key switch device, and achieve weight reduction of the keyboard.

Furthermore, the present invention relates to a portable electronic device provided with a keyboard on which a plurality of key switch devices are arranged and a sheet-type secondary battery, and particularly to a portable electronic device capable of facilitating the design and manufacture thereof and improving the reliability.

2. Description of Related Art

Conventionally, there have been proposed key switch devices each having a guide member constructed of a pair of link members mutually movably connected in an intersecting state, and the guide member serves to guide the vertical movement of a key top to effect a switching operation in association with the vertical movement of the key top. For example, such a key switch is disclosed in Japanese utility model application laid-open No. Hei 2-5236. This key switch is provided with a key top, an upper holder attached to an underside of the key top, a first lower holder and a second lower holder attached to a printed substrate, and two rectangular frames connected to each other in an X-shaped configuration as viewed in side elevation, which is disposed between the key top and the printed substrate.

In this key switch, an upper portion of one of the rectangular frames is slidably supported in the upper holder between the lower surface of the key top and the upper holder, while leg portions of the rectangular frame are rotatably supported in the first holder. On the other hand, an upper portion of the other rectangular frame is rotatably supported in a groove of the upper holder, while leg portions of the rectangular frame are slidably supported in the second holder. Furthermore, a rubber switch is disposed on the printed substrate, and a convex portion of the key top, projecting downward, is engaged with the rubber switch. The rubber switch is provided with a movable contact disposed corresponding to a fixed contact disposed on the printed substrate.

The above key switch is configured such that the key top is vertically moved with its horizontal position being maintained, no matter which portion of the key top is depressed by an operator. Accordingly, the movable contact of the rubber switch engaged with the key top is made into contact with the fixed contact of the printed substrate whenever the rubber switch is pushed upon depression of the key top, thus effecting a switching operation.

However, in the above key switch disclosed in Japanese utility model application laid-open publication No. Hei 2-5236, the first and second lower holders attached to the printed substrate are all inserted in mounting holes formed in the printed substrate (see FIGS. 2 and 4 in the publication) and fixed therein. Therefore, each lower end of the first and second lower holders is made projecting downward from a lower surface of the printed substrate.

Such projecting lower ends of the first and second lower holders may cause a difficulty in thickness reduction of the key switch and be against actual circumstances that the reduction of the thickness of a key switch is promoted.

To conform the need of reduction in size and thickness of a keyboard with a sufficient key stroke being ensured, applicant of the present invention proposed a key switch device which is disclosed in U.S. Pat. No. 5,504,283, in which an electrical circuit pattern is formed on an insulating layer provided on a metal substrate, and four mounting portions are formed integrally with the substrate by pressing and disposed surrounding a fixed contact pattern in the circuit pattern. Two of the four mounting portions are used as rotatably supporting portions, and the other two are used as slidably supporting portions.

In the above switch device, a guide supporting member constructed of two link members which are mutually rotatably connected is disposed between the key top and the substrate. A support shaft formed at an upper end of one of the link members is rotatably supported in the connecting portion formed on the underside of the key top and a support pin formed at a lower end of the link member is slidably supported in the slidably supporting portion of the substrate. A support pin formed at an upper end of the other link member is slidably supported in the connecting portion formed on the underside of the key top and a support shaft formed at a lower end of the link member is rotatably supported in the rotatably supporting portion of the substrate.

In the key switch disclosed in the U.S. Pat. No. 5,504,283, the metal substrate is formed integrally with the mounting portions (supporting portions) by pressing, the mounting portions serving to slidably or rotatably support the support pins or shafts disposed on the lower parts of the link members. Thus, this realizes a key switch device which can ensure a sufficient key stroke and reduce the size of the keyboard, especially the thickness thereof.

However, a predetermined pressing work to integrally form the mounting portions with the substrate needs a relatively large pressing die in order to form the mounting portions in the whole area of the substrate. Since the pressing die is expensive, the cost of the key switch device is increased in association therewith.

Furthermore, specifications such as the placement manner of key switches are generally determined in respective countries. If the key switch device is manufactured based on the specifications in the countries where the key switch device is to be used, plural types of a pressing die must be prepared to perform a suitable pressing work on a substrate in response to the respective specifications. Accordingly, the preparation of plural pressing dies, each being inherently expensive in cost, may cause the increase in cost of the key switch device.

Furthermore, the metal substrate itself used in the above key switch device is considerably heavy, so that the whole key switch device increases in weight. This obstructs weight reduction of the key switch device.

Meanwhile, there has also been known a portable electronic device, such as a notebook-size personal computer and the like, provided with the above key switch devices and a secondary battery which is rechargeable plural times and is built-in a main unit of the electronic device. When the secondary battery is charged in advance from an exterior power source, the electronic device can work on the secondary battery even in a place or area where the power supply from the exterior power source is impossible. Due to the shape, weight, thickness, etc. of the secondary battery, however, the secondary battery often had a disadvantageous effect on the portability and shape of the electronic device.

One type of the electronic device provided with the secondary battery is shown in FIG. 40. A secondary battery 239, attached to the internal bottom of an electronic device 240 such as a notebook-size personal computer, supplies necessary electricity to the electronic device 240 even when the electronic device 240 is used in a place where power supply from an exterior power source is impossible. As the secondary battery 239, various type shaving different shapes, weight, thickness are known. It is generally considered very large in thickness and weight.

In this way, since the electronic device 240 is provided with the secondary battery 239 which is selected from various types having different shapes, weight, thickness, etc., a designer has to design the electronic device 240 in consideration of the shape, weight, thickness, etc. of the secondary battery 239 in addition to the internal structure of the electronic device 240. This may impose a burdensome work on the designer or take much time to develop the electronic device 240.

Depending on the shape, thickness, and others of the secondary battery 239, sufficient heat radiation can not be carried out against the heat generated in the secondary battery 239 when charged from the exterior power source. Due to this insufficient heat radiation, the electronic device 240 may rise in temperature.

Because of the weight and the attachment position of the secondary battery 239, furthermore, the electronic device 240 loses its center of balance, which may cause damage to the portability of the electronic device 240.

SUMMARY OF THE INVENTION

The present invention has been made in view of the above circumstances and has an object to overcome the above problems and to provide a key switch device having mounting members for movably supporting lower ends of two link members of a guide member guiding vertical movement of a key top, the mounting members being fixed on a support plate by a predetermined one of various fixing manners, thus eliminating the need of a pressing die used in the prior art, so that the key switch device can reduce the manufacturing cost of the support plate and increase the design flexibility of a keyboard provided with a plurality of the key switch devices.

Another object of the present invention is providing a key switch device having mounting members for movably supporting lower ends of two link members of a guide member which guides vertical movement of a key top, the mounting members being fixed on a membrane switch member for conducting a switching operation by a predetermined fixing manner, thus eliminating the need of a pressing die used in the prior art, differently from the case where supporting portions are integrally formed in a support plate, so that the key switch device can reduce the manufacturing cost of the support plate, increase the design flexibility of a keyboard provided with a plurality of the key switch devices, and easily enable weight reduction.

Furthermore, another object of the present invention is to provide a portable electronic device provided with a key-board and a thin sheet-type secondary battery which can facilitate the design and manufacture of the portable electronic device and improve the reliability and safety of the same.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a key switch device including a key top, a support plate disposed below the key top, a guide member provided with a first link and a second link which are mutually movably connected, an upper end of the first link and an upper end of the second link being movably engaged with an underside of the key top and a lower end of the first link and a lower end of the second link being movably engaged with the support plate, and a switching section which is disposed on the support plate and performs a switching operation in association with a vertical movement of the key top, wherein the key switch device includes a first shaft formed at the lower end of the first link, a second shaft formed at the lower end of the second link, and a mounting member for movably supporting the first and second shafts, the mounting member being fixed on a surface of the support plate.

In the above key switch device according to the present invention, the mounting member is fixed on the surface of the support plate and movably supports the first and second shafts formed at the lower ends of the first and second links respectively of the guide member for guiding the vertical movement of the key top. Accordingly, the support plate has no need to be integrally formed with supporting portions for mounting the guide member by a press working and the like. This eliminates the necessity of an expensive pressing die, thus enabling the reduction of manufacturing cost of the support plate.

Even if the specifications such as the placement of the key switch devices in a keyboard are different according to countries where the key switch device is to be used, it is sufficient to fix an appropriate mounting member on the support plate in agreement with the specifications on a country-to-country basis. This can increase the design flexibility of a keyboard having the key switch devices without preparation of a pressing die for the specifications in each country.

According to another aspect of the present invention, there is provided a key switch device including a key top, a membrane switch member disposed below the key top, a guide member provided with a first link and a second link which are mutually movably connected, a switching member which performs a switching operation of the membrane member in association with a vertical movement of the key top, a first shaft formed at a lower end of the first link, a second shaft formed at a lower end of the second link, and a mounting member for movably supporting the first and second shafts, the mounting member being fixed on a surface of the membrane switch member.

In the above key switch device according to the present invention, the mounting member is fixed on the surface of the membrane switch member and movably supports the first and second shafts formed at the lower ends of the first and second links respectively of the guide member for guiding the vertical movement of the key top. Accordingly, a support plate has no need to be integrally formed with supporting portions by a press working and the like. This eliminates the necessity of an expensive pressing die, thus enabling the reduction of manufacturing cost of the key switch device.

Even if the specifications such as the key placement are different according to countries where the key switch device is to be used, it is sufficient to fix an appropriate mounting member on the membrane switch member in agreement with the specifications on a country-to-country basis. This can increase the design flexibility of a keyboard having the key switch devices without preparation of a pressing die for the specifications in each country.

Since the mounting member is fixed on the surface of the membrane switch member, a support plate may be eliminated, which achieves the weight reduction of the key switch device.

According to another aspect of the present invention, there is provided a portable electronic device provided with a key switch device including a key top, a support plate disposed below the key top, a guide member provided with a first link and a second link which are mutually movably connected, an upper end of the first link and an upper end of the second link being movably engaged with an underside of the key top and a lower end of the first link and a lower end of the second link being movably engaged with the support plate, and a switching section which is disposed on the support plate and performs a switching operation in association with a vertical movement of the key top, wherein the key switch device includes a first shaft formed at the lower end of the first link, a second shaft formed at the lower end of the second link, and a mounting member for movably supporting the first and second shafts, the mounting member being fixed on an upper surface of the support plate.

Preferably, the above portable electronic device further includes a keyboard on which a plurality of the key switch devices are disposed, the keyboard being closely disposed on the upper surface of the support plate, and a sheet type secondary battery which is plural times rechargeable and is provided with at least a positive electrode, a negative electrode, and an electrolyte which are arranged in layers so that the electrolyte is positioned between the positive and negative electrodes, the battery being disposed on an undersurface of the support plate.

In the portable electronic device according to the present invention, the key switches configuring the keyboard are arranged on the upper surface of the support plate, while the sheet type secondary battery is closely disposed on the underside of the support plate. Accordingly, the keyboard and the secondary battery are integrated through the support plate, so that a designer can design the electronic device without considering the shape, arrangement position, and others of the secondary battery. This provides advantages in the design of the electronic device. In addition, there is no need to provide special elements or components for attaching the sheet type secondary battery to the electronic device. This is very effective in reducing manufacturing cost. The support plate, to which the heat which generates in the charging of the secondary battery from an external power source is transmitted, is directly exposed to the air through clearances between the key switches, and thus the heat can be sufficiently dissipated. Accordingly, the reliability and safety of the electronic device can be improved.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 20 is a schematic side view of the key switch devices in the fourth embodiment, one of which is shown in an exploded state;

FIG. 21 is a schematic side view of an alternative of the key switch devices in the fourth embodiment;

FIG. 35A is a side view of a keyboard and a sheet type secondary battery included in a notebook-size personal computer in the seventh embodiment, the secondary battery being illustrated in a sectional view;

FIG. 35B is an enlarged view of a circled part B in FIG. 35A;

FIG. 37A is a side view of a keyboard and a sheet type secondary battery in a notebook-size personal computer in an eighth preferred embodiment according to the present invention, the secondary battery being illustrated in a sectional view;

FIG. 37B is an enlarged view of a circled part B in FIG. 37A;

DETAILED DESCRIPTION OF THE PREFERRED EMBODIMENT

A detailed description of preferred embodiments of a key switch device embodying the present invention will now be given referring to the accompanying drawings.

Figure 1:
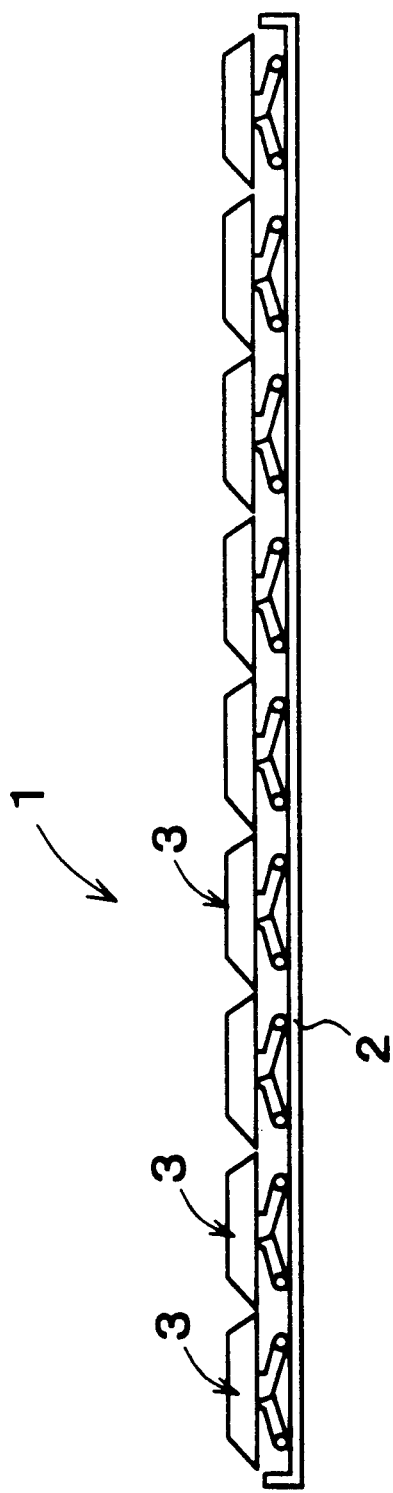
FIG. 1 is a schematic side view of a keyboard provided with key switch devices in a first preferred embodiment according to the present invention.
Figure 2:
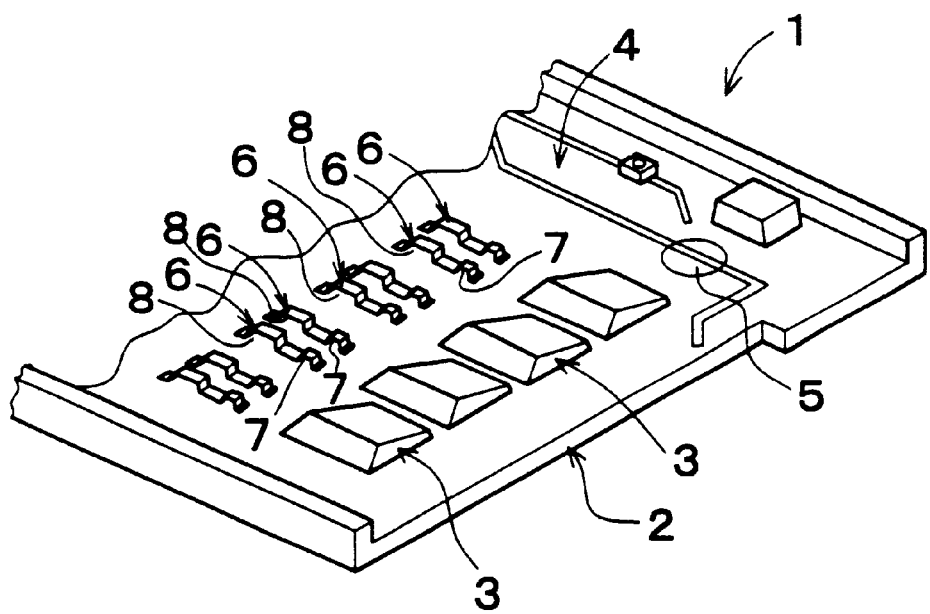
FIG. 2 is a schematic perspective partial view of the keyboard in the first preferred embodiment, where some of key tops of the key switch devices are omitted.

First, the structure of a keyboard having a plurality of key switch devices arranged on a support plate in a first embodiment is described below. FIG. 1 is a schematic side view of the keyboard. FIG. 2 is a schematic perspective view of a part of the keyboard, in which some of key tops of the key switch devices are omitted.

Figure 34:
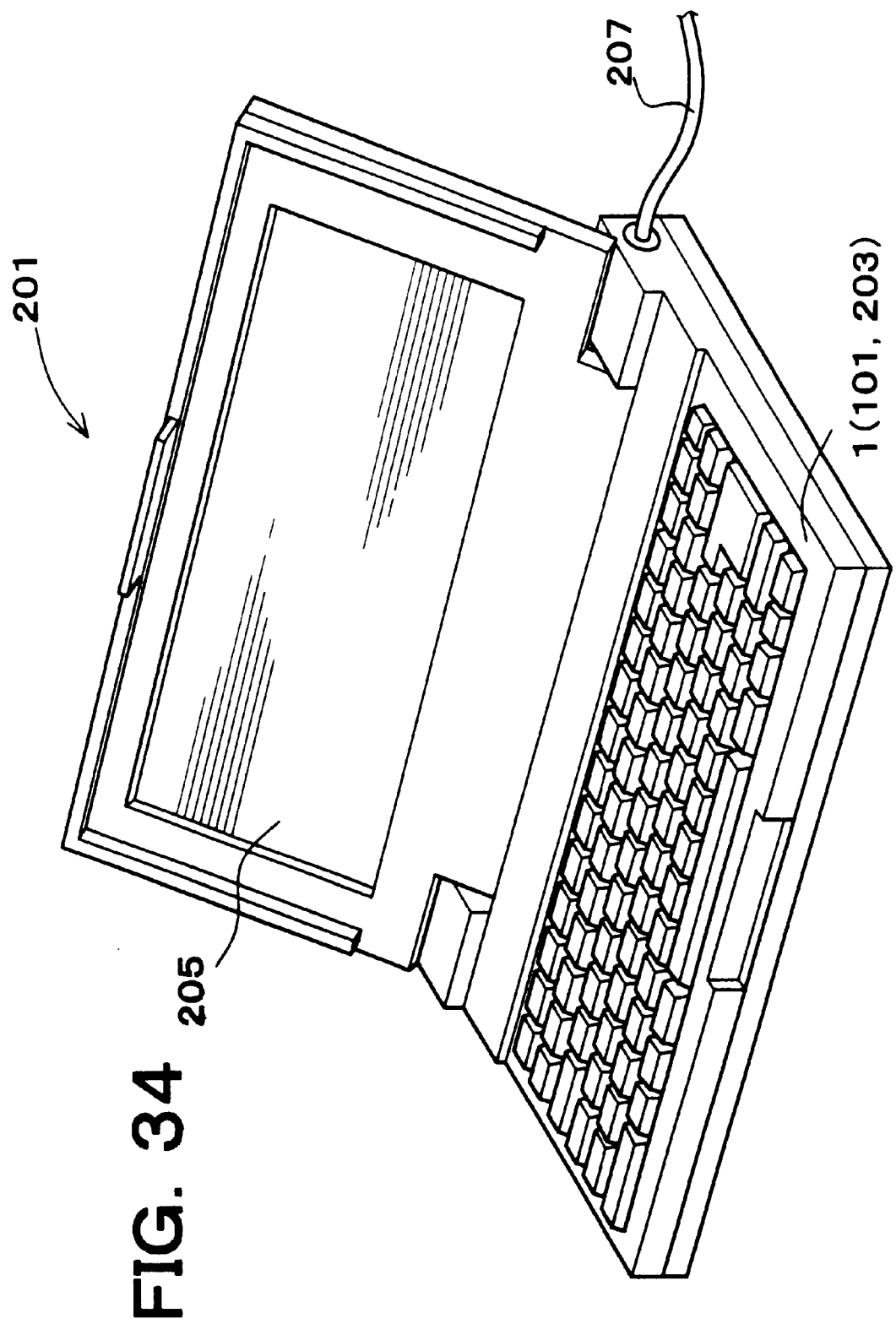
FIG. 34 is a perspective view of a notebook-size personal computer provided with a keyboard having a plurality of key switch devices in a first through tenth preferred embodiments according to the present invention.

The keyboard is mounted on a notebook-size personal computer shown in FIG. 34. This notebook-size personal computer 201 is mainly provided with the keyboard 1, a liquid crystal display 205, and a power cord 207 through which electric power is supplied to the computer 201.

As shown in FIG. 1, the keyboard 1 is provided with a thin support plate 2 made of aluminum and a plurality of key switch devices 3. Those key switch devices 3 are arranged on the plate 2 in the longitudinal and transverse directions thereof as shown in FIGS. 2 and 34. An electrical insulating layer (not shown) is formed on the surface of the support plate 2 and a predetermined circuit pattern 4 is formed with a conductive ink and the like on the electrical insulating layer. A fixed contact pattern 5 is formed at a substantially center in each of the areas where the key switch devices 3 are disposed one-by-one on the circuit pattern 4. The circuit pattern 4 with the contact pattern 5 is used to detect whether or not the key switch device 3 has been depressed.

In each of the areas associated with the key switch devices 3, a pair of mounting members 6 are arranged in parallel at a predetermined distance therebetween on the upper surface of the support plate 2 and fixed thereto with an adhesive. The paired mounting members 6 are identical in structure, and one of them is explained below. The mounting member 6 is made in such a manner that linear metal such as aluminum or iron is worked into a predetermined shape and cut into a chip having the unit length of a key switch device 3. The thus formed mounting member 6 has a rotatably supporting portion 7 and a slidably supporting portion 8, as will be mentioned later. The rotatably supporting portion 7 has a recess and is so configured as to rotatably engage with a rotatable shaft 18 formed at a lower end of a first link 14 constructing a guide member 10 which guides the vertical movement of a key top 9. The slidably supporting portion 8 has an elongated recess and is so configured as to slidably engage with a slidable shaft 20 formed at a lower end of a second link 15.

As an adhesive for fixing the mounting member 6 to the support plate 2, a commercially available adhesive which is usable for high-density packaging of various chip components is used. For instance, preferably used is an epoxy adhesive that is hardened in a short time and is excellent in heat-resistance to soldering, in electrical and mechanical properties, and in insulating properties. The mounting member 6 may be directly fixed on the support plate 2 or be fixed on the insulating resist layer formed on the support plate 2. It is to be noted that if the mounting member 6 is directly fixed on the support plate 2, the insulating resist layer is not provided on the portions of the support plate 2 where the mounting member 6 is to be adhered. The mounting member 6 is thus fixed, with an adhesion, directly on the support plate 2 in the portions uncoated with the insulating resist layer.

Figure 3:
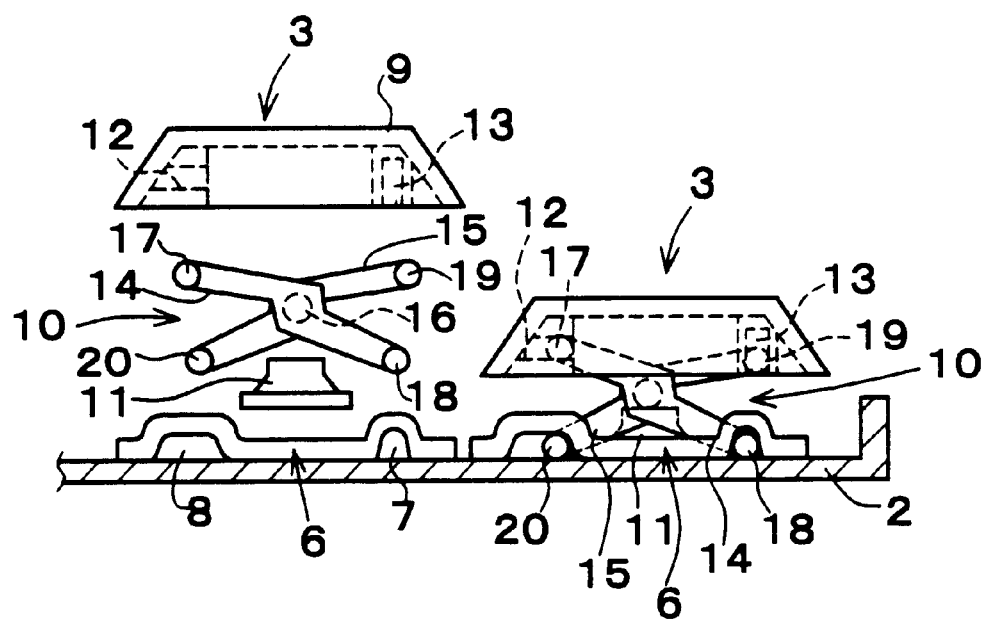
FIG. 3 is a schematic side view of the key switch devices in the first preferred embodiment, one of which is shown in an exploded state.

Next, the structure of the key switch device 3 is described with reference to FIG. 3 which is a schematic side view of the key switch devices, a left one of which is shown in an exploded state. The key switch device 3 is mainly constructed of the key top 9, the guide member 10 for vertically movably supporting the key top 9, a rubber spring 11 disposed under the guide member 10 and over the fixed contact pattern 5 of the circuit pattern 4 formed on the support plate 2, and the pair of mounting members 6. The circuit pattern 4 may be constructed of a membrane substrate including a single layer or two or three layers. In this case, some rubber springs have a movable electrode therein, and others have no movable electrode.

The key top 9 is formed of a synthetic resin, such as an ABS resin. A predetermined character, symbol, and the like is provided on the upper surface of the key top 9 by printing or the like. The underside of the key top 9 is integrally provided with connecting portions 12 and 13. The connecting portion 12 is positioned above the slidably supporting portion 8 of the mounting member 6 fixed on the support plate 2 and the connecting portion 13 is positioned above the rotatably supporting portion 7, as viewed in FIG. 3. These connecting portions 12 and 13 may be constructed of components separately configured from the key top 9 and attached to the underside of the key top 9.

The guide member 10 is constructed of a first link 14 and a second link 15 which are intersected and mutually rotatably connected together at a fulcrum portion 16. The first link 14 is provided with a slidable shaft 17 projecting outward (i.e., vertically to the drawing sheet) at an upper end of the first link 14. This shaft 17 is horizontally slidably supported in the connecting portion 12 of the key top 9. The first link 14 is also provided with a rotatable shaft 18 projecting outward (i.e., vertically to the drawing sheet) at a lower end of the first link 14. This shaft 18 is rotatably supported in the rotatably supporting portion 7 of the mounting member 6.

The second link 15 is provided with a rotatable shaft 19 projecting outward at an upper end of the second link 15. This shaft 19 is rotatably supported in the connecting portion 13 of the key top 9. The second link 15 is also provided with a slidable shaft 20 projecting outward at a lower end of the second link 15. This shaft 20 is horizontally slidably supported in the slidably supporting portion 8 of the mounting member 6. The structures of the first and second links 14 and 15 constituting the guide member 10 are substantially the same as those of the link members disclosed in Japanese utility model No. 2,589,927. Accordingly, the detail description of the structures is referred thereto and omitted in the present specification.

The rubber spring 11 is formed into an inverted cup-shape and of a rubber material, such as silicon or EPDM, which includes a movable contact (not shown) disposed on the internal upper wall of the rubber spring 11. This movable contact is opposed to the fixed contact pattern 5 of the circuit pattern 4 on the support plate 2. Above the rubber spring 11, the fulcrum portion 16 of the guide member 10 is positioned.

Figure 4:
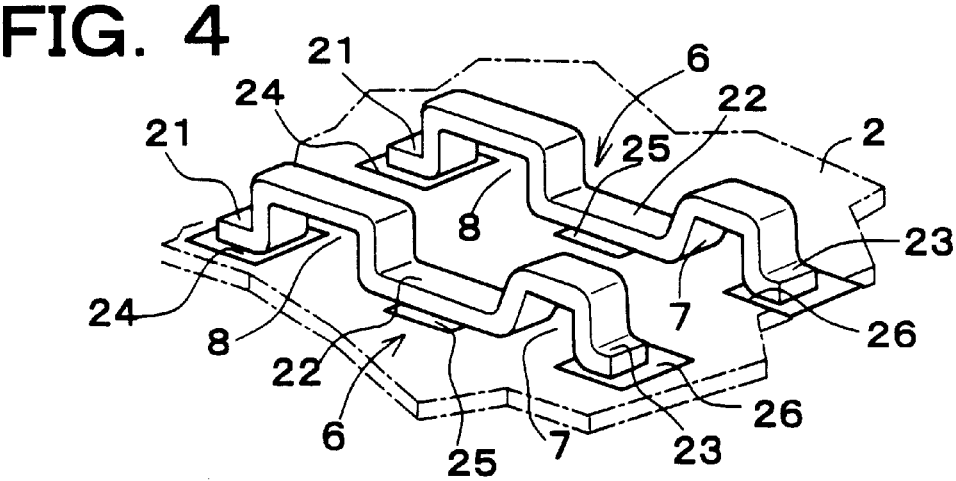
FIG. 4 is a perspective view of mounting members fixed on a support plate of the key switch device.

As shown in FIG. 4, the mounting member 6 in the first embodiment is provided with the slidably supporting portion 8 permitting sliding of the slidable shaft 20 of the second link 15, the rotatably supporting portion 7 permitting rotating of the rotatable shaft 18 of the first link 14, a first adhering portion 21 continuously extending from the slidably supporting portion 8 to the left in FIG. 4, a second adhering portion 22 connecting the supporting portions 7 and 8, and a third adhering portion 23 continuously extending from the supporting portion 7 to the right in FIG. 4. The first, second, and third adhering portions 21, 22, and 23 of the mounting member 6 are adhered to the support plate 2 through a first, second, and third adhesive layers 24, 25, and 26, respectively, applied on the support plate 2. Thus, the mounting member 6 is adhered to and fixed on the support plate 2.

Figure 5:
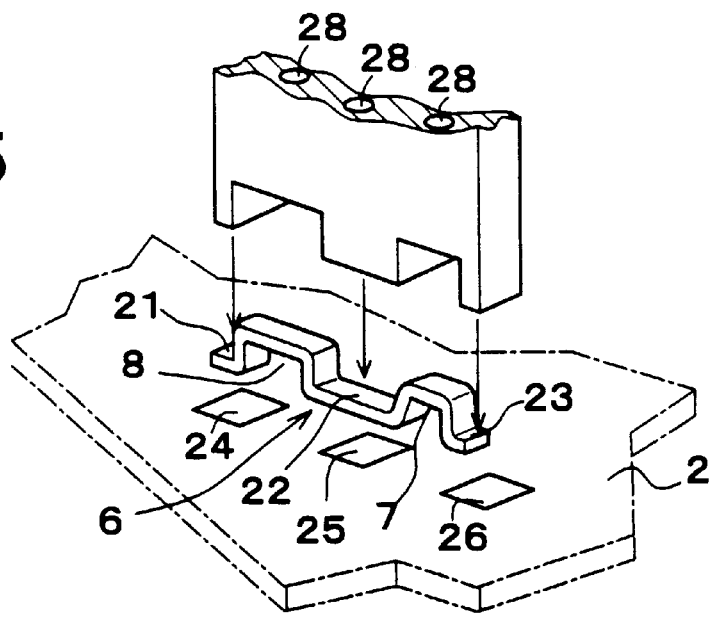
FIG. 5 is an explanatory view showing a fixing manner to fix a mounting member on a support plate with use of a suction head.

The mounting member 6 having the above configuration is produced by continuously drawing a part of a flat linear material from a roll thereof and molding it into a predetermined shape, and cutting it by the unit length of the key switch device 3. Alternatively, the mounting member 6 may be made of resin by molding. The mounting member 6 produced as above is fixed on the support plate 2 in the following manner; the support plate 2 which has been formed into a predetermined shape is first set in a predetermined position; then, the first, second, and third adhesive layers 24, 25, and 26 are applied to the support plate 2 in each position corresponding to the key switch device 3 by a known automatic adhesive applying device. With an automatic mounting device loading the mounting member 6 chipped as above, as shown in FIG. 5, the mounting member 6 stuck to a suction head 27 under suction through suction holes 28 is placed on the support plate 2 such that the first, second, and third adhering portions 21, 22, and 23 correspond to the first, second, and third adhesive layers 24, 25, and 26, respectively, and then the mounting member 6 is pressed onto the support plate 2 by the suction head 27 at a predetermined pressure. The mounting member 6 is thus adhered to and fixed on the support plate 2 in a predetermined position through the first through third adhesive layers 24, 25, and 26. The underside of the suction head 27 has a shape corresponding to the shape of the mounting member 6 as shown in FIG. 5, so that the head 27 can securely press the mounting member 6 to the first, second, and third adhesive layers 24–26 respectively.

The operation of the key switch device 3 having the above construction is explained below.

When the key top 9 is depressed, the slidable shaft 17 of the first link 14 is slid horizontally (leftward in FIG. 3) in the connecting portion 12 of the key top 9 and, simultaneously, the rotatable shaft 18 is rotated counterclockwise in the supporting portion 7 of the mounting member 6. At the same time, the rotatable shaft 19 of the second link 15 is rotated clockwise in the connecting portion 13 of the key top 9 and, simultaneously, the slidable shaft 20 is slid horizontally (leftward in FIG. 3) in the supporting portion 8 of the mounting member 6. The fulcrum portion 16 connecting the first and second link 14 and 15 is accordingly lowered to gradually depress the rubber spring 11. When the amount of depression of the rubber spring 11 exceeds a certain limit, the rubber spring 11 is buckled. As a result, the movable contact provided on the internal upper wall of the rubber spring 11 is made into contact with the fixed contact pattern 5 of the circuit pattern 4, thus effecting a switching operation.

When the depression force applied to the key top 9 is removed, the fulcrum portion 16 of the first and second links 14 and 15 is lifted by an elastic restoring force of the rubber spring 11. In association therewith, the shafts 17 and 18 of the first link 14 and the shafts 19 and 20 of the second link 15 are operated reversely to the above, and thus the key top 9 is returned to the original position shown in FIG. 3.

Figure 6:
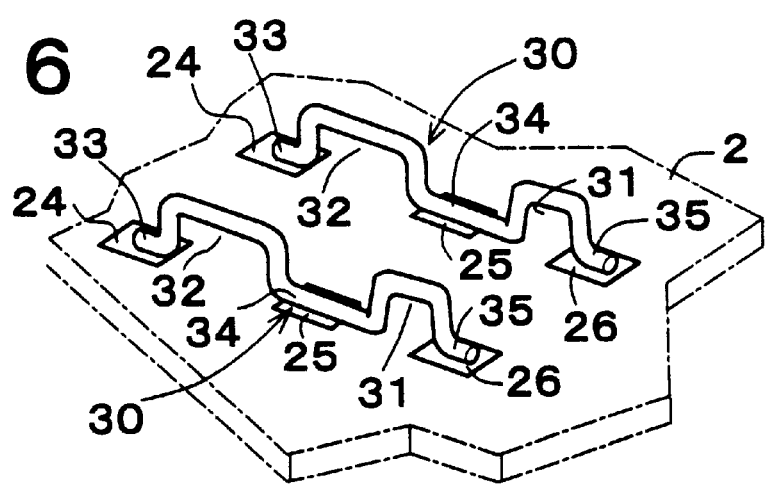
FIG. 6 is a perspective view of mounting members fixed on a support plate in a key switch device in a second preferred embodiment according to the present invention.

Next, a key switch device in a second preferred embodiment according to the present invention will now be described with reference to FIG. 6. The key switch device in this embodiment has substantially the same structure as in the first embodiment, except that the mounting member 6 in the second embodiment is made of a needle-like linear material, which is different from the mounting member 6 in the first embodiment made of a flat linear material. Accordingly, parts identical to those of the first embodiment are indicated at the same reference numerals. The following description is focused on the specific feature to the key switch device in the second embodiment. FIG. 6 is a perspective view of mounting members fixed on a support plate in a key switch device in a second preferred embodiment according to the present invention.

In FIG. 6, a mounting member 30 is provided with a rotatably supporting portion 31 and a slidably supporting portion 32 and first, second, and third adhering portions 33, 34, and 35. The rotatably supporting portion 31 is so configured as to permit therein rotation of a rotatable shaft 18 of a first link 14. The slidably supporting portion 32 is so configured as to permit therewithin horizontal sliding of a slidable shaft 20 of a second link 15. The first adhering portion 33 continuously extends from the slidably supporting portion 32 to the left in FIG. 6. The second adhering portion 34 connects the supporting portions 31 and 32. The third adhering portion 35 continuously extends from the rotatably supporting portion 31 to the right in FIG. 6. The first, second, and third adhering portions 33, 34, and 35 of the mounting member 30 are adhered to and fixed on the support plate 2 through a first, second, and third adhesive layers 24, 25, and 26, respectively, applied on the support plate 2. As a result, the mounting member 30 is fixed on the support plate 2.

The mounting member 30 having the above configuration is produced by continuously drawing a part of a needle-like linear material from a roll thereof and molding it into a predetermined shape, and cutting it by the unit length of the key switch device 3. The thus produced mounting member 30 is fixed on the support plate 2 in the following manner; the support plate 2 which has been formed into a predetermined shape is first set in a predetermined position; then, the first, second, and third adhesive layers 24, 25, and 26 are applied to the support plate 2 in respective positions within the area corresponding to the key switch device 3 by a known automatic adhesive applying device. With an automatic mounting device loading the mounting member 30 chipped as above, as shown in FIG. 5, the mounting member 30 stuck to a mounting head (not shown) under suction is placed such that the first, second, and third adhering portions 33, 34, and 35 correspond to the first, second, and third adhesive layers 24, 25, and 26, respectively, and then the mounting member 30 is pressed onto the support plate 2 by the mounting head at a predetermined pressure. The mounting member 30 is thus adhered and fixed on the support plate 2 in a predetermined position through the first through third adhesive layers 24, 25, and 26.

Figure 7:
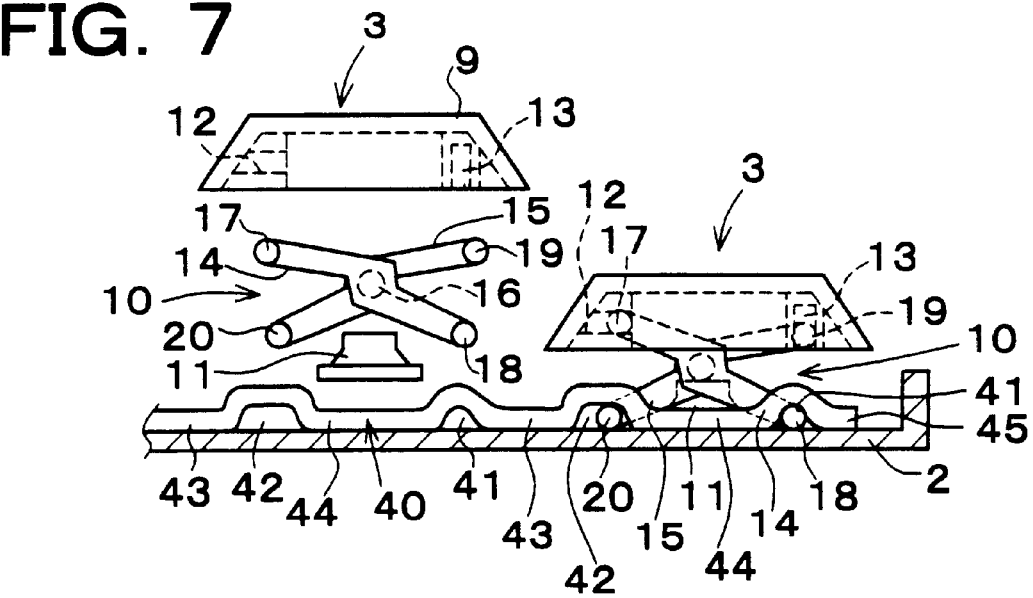
FIG. 7 is a schematic side view of key switch devices in a third preferred embodiment according to the present invention, one of which is shown in an exploded state.

Next, a key switch device in a third preferred embodiment according to the present invention will be described with reference to FIG. 7. The key switch device in this embodiment has substantially the same structure as in the first and second embodiments, except that the mounting member in the third embodiment is formed having a length corresponding to a plurality of key switch devices aligned in a row on a support plate in the longitudinal and transverse directions respectively, while the mounting members 6 and 30 in the first and second embodiments are chipped in correspondence to the unit length of the key switch device 3. Accordingly, parts identical to those of the first and second embodiments are indicated at the same reference numerals. The following description is focused on the feature of the key switch device in the third embodiment. FIG. 7 is a perspective side view of a key switch device in the third embodiment.

In FIG. 7, the key switch device 3 is mainly constructed of, like in the above mentioned embodiments, a key top 9, a guide member 10 for supporting the key top 9 so as to permit the vertical movement of the key top 9, a rubber spring 11 disposed under the guide member 10 and over a fixed contact pattern 5 of a circuit pattern 4 formed on a support plate 2, and a pair of mounting members 40 (only one of which is shown in FIG. 7).

The mounting member 40 is formed with a length covering a plurality of key switch devices 3 as shown in FIG. 7. The mounting member 40 has, in each of the portions which are in one-to-one correspondence with the key switch devices 3, a rotatably supporting portion 41 for rotatably supporting a rotatable shaft 18 of a first link 14 and a slidably supporting portion 42 for slidably supporting a slidable shaft 20 of a second link 15. In such the long mounting member 40 as shown in FIG. 7, for example, the part existing between the slidably supporting portion 42 associated with the right key switch device 3 and the rotatably supporting portion 41 associated with the left key switch device 3 is a first adhering portion 43, and the part existing between the supporting portions 41 and 42 for one key switch device 3 is a second adhering portion 44. The part formed continuing from the supporting portion 41 associated with the key switch device 3 positioned in one end of the mounting member 40 (for example, in a right end in FIG. 7) is a third adhering portion 45. It is to be noted that the number of key switch devices 3 associated with the mounting member 40 can optionally be determined according to various specifications for the keyboard 1.

The first, second, and third adhering portions 43, 44, and 45 of the mounting member 40 are adhered and fixed on the support plate 2 through the first, second, and third adhesive layers 24, 25, and 26 (see FIGS. 4 and 6), respectively. The mounting member 40 is thus adhered and fixed on the support plate 2.

The mounting member 40 is produced by continuously drawing a part of a flat linear material from a roll thereof and molding it into a predetermined shape, and cutting it by the length corresponding to a plurality of the key switch devices 3. The thus produced mounting member 40 is fixed on the support plate 2 in the following manner, like in the above embodiments; the support plate 2 which has been formed into a predetermined shape is first set in a predetermined position; then, the first, second, and third adhesive layers 24, 25, and 26 are applied to the support plate 2 in respective positions within the area corresponding to the key switch device 3 by a known automatic adhesive applying device. With an automatic mounting device loading the long mounting member 40, the mounting member 40 being held in the mounting device is placed such that the first, second, and third adhering portions 43, 44, and 45 correspond to the first, second, and third adhesive layers 24, 25, and 26, respectively, and then the mounting member 40 is pressed onto the support plate 2 by a mounting head at a predetermined pressure. The mounting member 40 is thus adhered and fixed on the support plate 2 at a predetermined position through the first through third adhesive layers 24, 25, and 26.

Although each of the mounting members 6, 30, 40 in the first, second, and third embodiments is adhered and fixed on the support plate 2 through the first, second, and third adhesive layers 24, 25, and 26, those mounting members 6, 30, and 40 may be fixed on the support plate 2 with use of various fixing manners besides the above-mentioned adhering manner with an adhesion. Some of the fixing manners for fixing the mounting member 6 on the support plate 2 in the first embodiment will be described below as examples.

Figure 8:
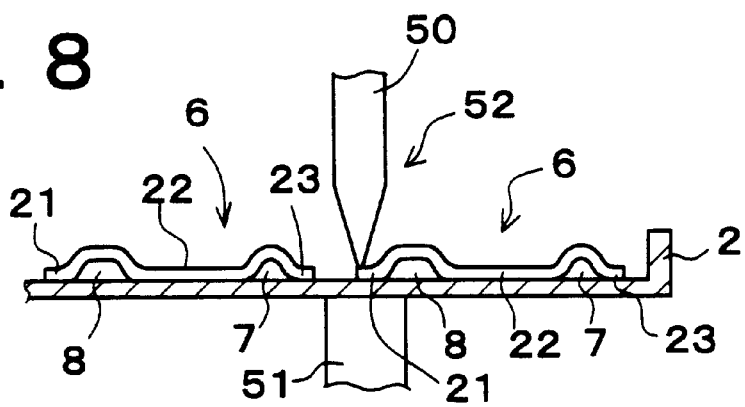
FIG. 8 is an explanatory view of a spot welding manner to fix mounting members on a support plate.

When the support plate 2 and the mounting member 6 made of aluminum or iron and the like are used, for example, the mounting member 6 can be fixed on the support plate 2 by a so-called spot-welding manner. This case is explained below in detail with reference to FIG. 8 which is an explanatory view schematically showing the spot welding manner to fix the mounting member 6 on the support plate 2.

To fix the mounting member 6 on the support plate 2 by the spot-welding, first, the support plate 2 which has been formed into a predetermined shape is set in a predetermined position. The chipped mounting member 6 is set in a predetermined position on the support plate 2 with use of the automatic mounting device. At this time, the mounting member 6 is preferably temporarily fixed on the support plate 2 in the predetermined position with an adhesion and the like which will not interfere with the spot-welding. Then, a spot welding device 52 provided with a pair of electrodes 50 and 51 is so positioned that the upper electrode 50 is made into contact with the first adhering portion 21 of the mounting member 6 and the lower electrode 51 is made into contact with the lower surface of the support plate 2. By the passage of a high current between the upper and lower electrodes 50 and 51, a spot-welding is effected. Subsequently, this work is repeated in the second and third adhering portions 22 and 23. As a result, the mounting member 6 is welded-fixed on the support plate 2.

Figure 9:
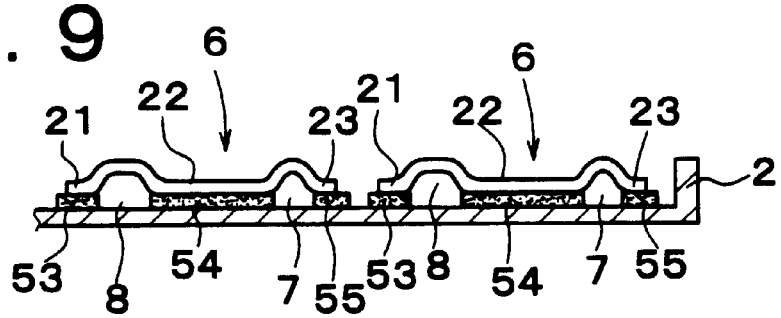
FIG. 9 is an explanatory view of a soldering manner to fix mounting members on a support plate.

Alternatively, a soldering manner may be used for fixing the mounting member 6 on the support plate 2. This manner is explained below with reference to FIG. 9.

To fix the mounting member 6 on the support plate 2 by the soldering, the support plate 2 which has been formed into a predetermined shape is set in a predetermined position with respect to an automatic soldering device. Then, first, second, and third cream soldering layers 53, 54, and 55 are applied onto the support plate 2 in correspondence to the key switch device 3. Thereafter, with an automatic mounting device loading the mounting member 6 chipped as above, the mounting member 6 is placed on the support plate 2 such that the first, second, and third adhering portions 21, 22, and 23 correspond to the first, second, and third cream soldering layer 53, 54, and 55, respectively. The reflow soldering process is then carried out. As a result, the mounting member 6 is soldered to the support plate 2.

Figure 10:
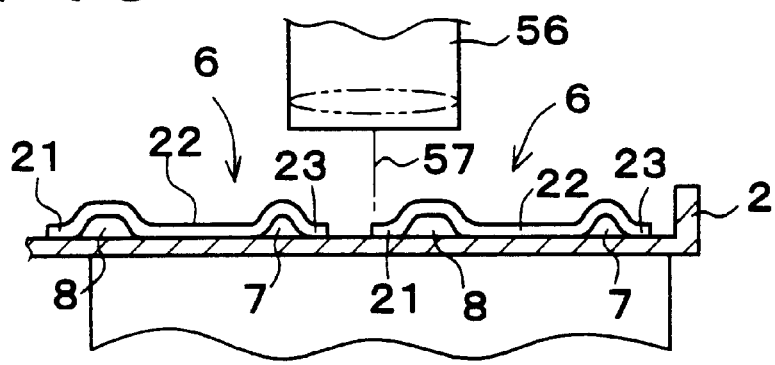
FIG. 10 is an explanatory view of a laser-welding manner to fix mounting members on a support plate.

Alternatively, a laser-welding manner may be used for fixing the mounting member 6 on the support plate 2. This manner is explained below with reference to FIG. 10.

To fix the mounting member 6 on the support plate 2 by the laser welding, the support plate 2 which has been formed into a predetermined shape is set in a predetermined position. With an automatic mounting device loading the mounting member 6 chipped as above, the mounting member 6 is placed in a predetermined position on the support plate 2. At this time, the mounting member 6 is preferably fixed temporarily in the predetermined position with an adhesive which will not interfere with the laser-welding. A laser-welding device is operated to consecutively emit a laser beam 57 from a laser head 56 to the first, second, and third adhering portions 21, 22, and 23 from above. As a result, the mounting member 6 is fixed on the support plate 2.

Figure 11:
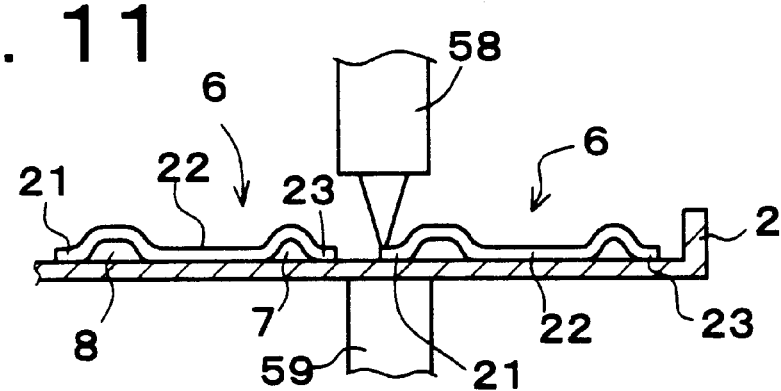
FIG. 11 is an explanatory view of an ultrasonic welding manner to fix mounting members on a support plate.

Alternatively, an ultrasonic welding manner may be used for fixing the mounting member 6 on the support plate 2. This manner is explained below with reference to FIG. 11.

To fix the mounting member 6 on the support plate 2 by the ultrasonic welding, first, the support plate 2 which has been formed into a predetermined shape is set in a predetermined position. With an automatic mounting device loading the mounting member 6 chipped as above, the mounting member 6 is placed in a predetermined position on the support plate 2. At this time, the mounting member 6 is preferably fixed temporarily in the predetermined position with an adhesive which will not interfere with the ultrasonic welding. An ultrasonic welding device provided with a pair of horns 58 and 59 is used. The upper horn 58 is made into contact with the first adhering portion 21 and the lower horn 59 is made into contact with the support plate 2. Then, high-frequency is applied between the upper and lower horns 58 and 59. This work is repeated in sequence on the second and third adhering portions 22 and 23. The mounting member 6 is thus ultrasonic-welded to the support plate 2.

Furthermore, a caulking manner may also be used for fixing the mounting member 6 on the support plate 2. This manner is explained with reference to FIG. 12.

Figure 12:
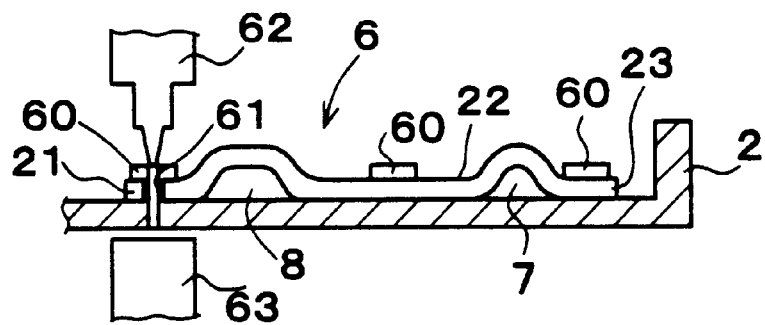
FIG. 12 is an explanatory view showing a caulking manner to fix mounting members on a support plate.

To fix the mounting member 6 on the support plate 2 by the caulking manner, first, the support plate 2 is subjected to a so-called burring process to form cylindrical burring portions 60 in positions corresponding to the first, second, and third adhering portions 21, 22, and 23 of the mounting member 6. The mounting member 6 is formed with through-holes 61 in the first, second, and third adhering portions 21, 22, and 23. Then, the support plate 2 is set in a predetermined position and, with an automatic mounting device loading the mounting member 6 chipped as above, the support plate 6 is placed on the support plate 2 such that the burring portions 60 of the support plate 2 are inserted in the through-holes 61 of the first, second, and third adhering portions 21, 22, and 23 respectively. Thereafter, an upper punch 62 is placed on the burring portion 60, while a lower punch 63 is made into contact with the lower surface of the support plate 2, and the caulking is effected. As a result, the head of the burring portion 60 is extended on each upper surface of the first, second, and third adhering portions 21, 22, and 23 as shown in FIG. 12, so that the mounting member 6 is fixed on the support plate 2 by the caulking.

In the key switch device 3 in the first, second, and third embodiments described above, each of the mounting members 6, 30, and 40 has the rotatably supporting portion 7 (or 31, 41) which rotatably supports the rotatable shaft 18 formed at the lower end of the first link 14 of the guide member 10 and the slidably supporting portion 8 (or 32, 42) which slidably supports the slidable shaft 20 formed at the lower end of the second link 15, and the mounting member is fixed on the support plate 2 through the first, second, and third adhesive layers 24, 25, and 26. It is therefore unnecessary to form supporting portions in the support plate 2 by a press working. Accordingly, the need of a pressing die used in the press working is eliminated, and the manufacture cost of the support plate 2 can be reduced. The need of producing such a die is also eliminated, so that the manufacture of the support plate can be started earlier.

Even if the specifications of the keyboard 1 provided with a plurality of the key switch devices 3 are different on a country-to-country basis, it is sufficient to fix the mounting member 6 (30, 40) on the support plate 2 through the adhesive layers 24, 25, and 26 in response to the specifications. This can increase the design flexibility of the keyboard 1 having the key switch devices 3 without preparation of a pressing die for the different specifications on a country-to-country basis.

In the key switch device 3 in the first and second embodiments, the mounting member 6 (30) fixed on the support plate 2 is formed in a chip having the unit length of one key switch device 3. Consequently, the design flexibility of the keyboard 1 having a plurality of the key switch devices 3 can be further increased when the key switch device 3 is manufactured so as to satisfy different specifications thereof on a country-to-country basis.

In the third embodiment, the mounting member 40 is so designed as to have the length corresponding to a plurality of the key switch devices 3 disposed on the support plate 2 so that the shafts 18 of the first links 14 and the shafts 20 of the second links 15 are rotatably or slidably supported. In correspondence to each row of the key switch devices 3, the mounting member 40 is fixed on the support plate 2 through the adhesive layers 24, 25, and 26. Accordingly, the number of adhering steps for fixing the mounting members 40 to the support plate 2 can be decreased as compared with the first and second embodiments where the chipped mounting members 6, 30 are fixed individually to the support plate 2. This can reduce the cost of the key switch device 3.

It is to be noted that the invention is not limited to the above preferred embodiment but various modifications and changes may be made without departing from the scope of the invention.

Figure 13:
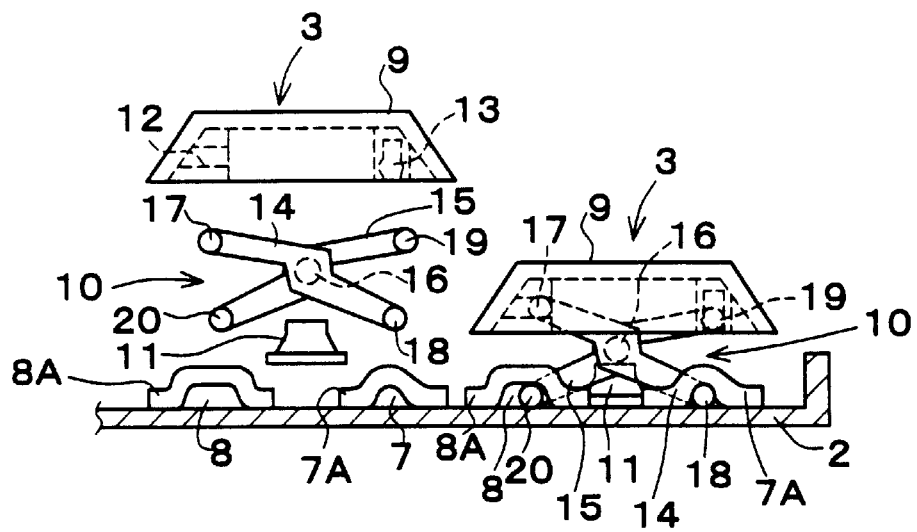
FIG. 13 is a side view of an alternative of the key switch devices in the first embodiment.

For example, although the mounting member 6 of the key switch device 3 in the first embodiment is formed in a chip having the unit length of one key switch device 3, the mounting member 6 may alternatively be formed of two separate supporting portions 7A and 8A as shown in FIG. 13. When the mounting member 6 is configured of the supporting portions 7A and 8A separately formed, the forming pattern of the adhesive layers applied onto the support plate 2 are required changing in correspondence to the separate portions 7A and 8A.

Figure 14:
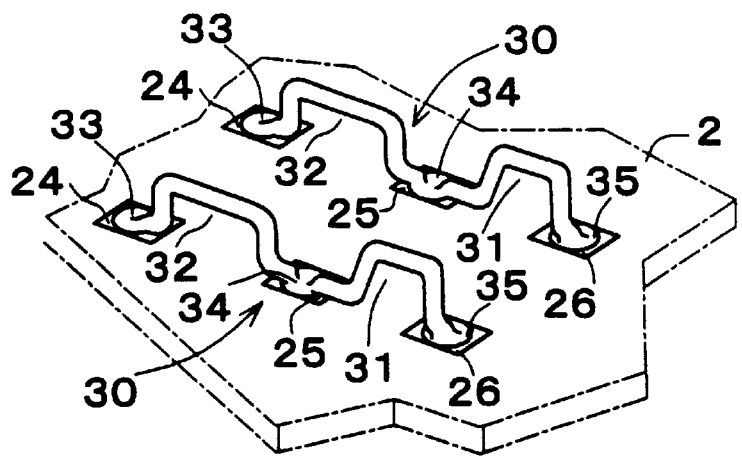
FIG. 14 is a perspective view of an alternative of the key switch devices in the second embodiment.

Although the mounting member 30 of the key switch device 3 in the second embodiment is made of a needle-like material, the first, second, and third adhering portions 33, 34, and 35 which are associated with the adhesive layers 24, 25, and 26 respectively may be shaped like a flat plate, as shown in FIG. 14. In this case, the adhering area of the adhering portions 33, 34, and 35 to the adhesive layers 24, 25, and 26 are extended, so that the mounting member 30 can firmly and securely fixed on the support plate 2.

Although the mounting member 6 of the key switch device 3 in the first embodiment is provided with the first, second, and third adhering portions 21, 22, and 23 and the supporting portions 7 and 8 which are formed between the adhering portions, the mounting member 6 may be alternatively modified as below.

Figure 15:
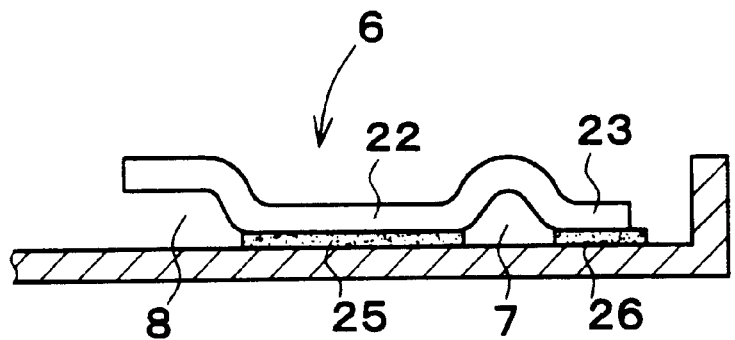
FIG. 15 is a side view of a first alternative of the mounting member in the first embodiment, fixed on a support plate.

A first alternative of the mounting member 6 may have a supporting portion 8 opening at one side (the left side in FIG. 15) and no first adhering portion 21.

Figure 16:
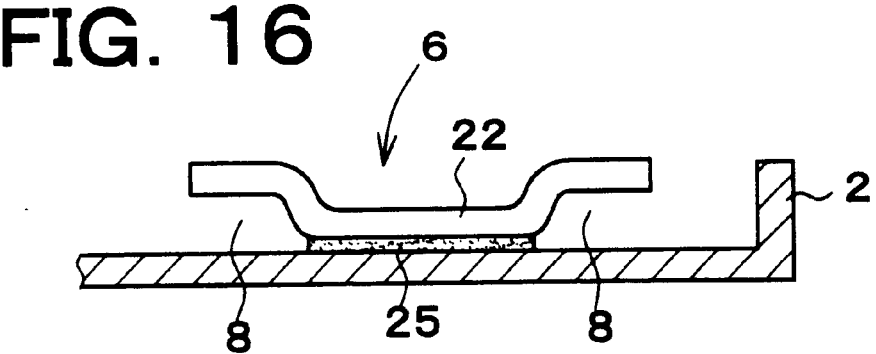
FIG. 16 is a side view of a second alternative of the mounting member in the first embodiment, fixed on a support plate.

A second alternative of the mounting member 6 may have the supporting portions 8 opening at opposite sides and no first and third adhering portions 21 and 23, as shown in FIG. 16. It is to be noted that the forming pattern of the adhesive layers are needed changing according to those alternatives. In this case, like the shaft 20 of the second link 15, the shaft 18 of the first link 14 is also slid in the supporting portion 8.

Figure 17:
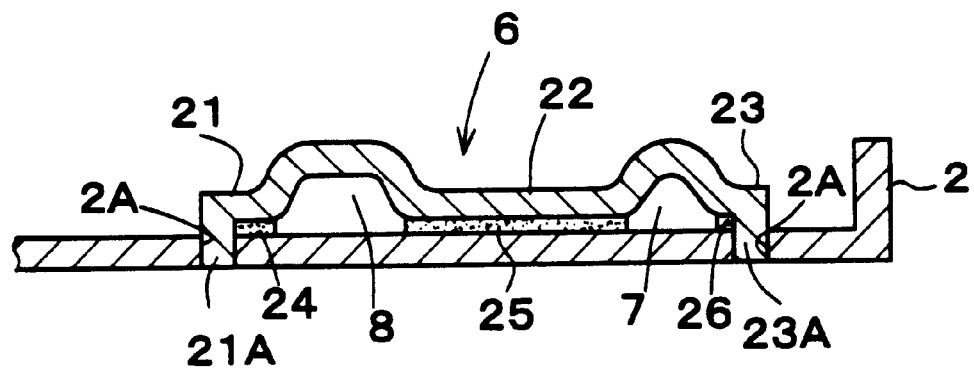
FIG. 17 is a side view of a third alternative of the mounting member in the first embodiment, fixed on a support plate.

A third alternative of the mounting member 6 may have the first and third adhering portions 21 and 23 provided with end portions 21A and 23A which are bent downward as shown in FIG. 17 and function of positioning the mounting member 6 in place. When these end portions 21A and 23A are inserted in holes 2A formed in the support plate 2, the mounting member 6 can be placed in a predetermined position on the support plate 2.

Next, a fourth preferred embodiment of a key switch device according to the invention will be described with reference to FIGS. 18 and 19, in which a plurality of the key switch devices are arranged configuring a keyboard. It is to be noted that parts identical to those of the above first through third embodiments are indicated at the same reference numerals.

The keyboard is mounted on a notebook-size personal computer shown in FIG. 34. This notebook-size personal computer 201 is mainly provided with the keyboard 101, a liquid crystal display 205, and a power cord 207 through which electric power is supplied to the computer 201.

Figure 18:
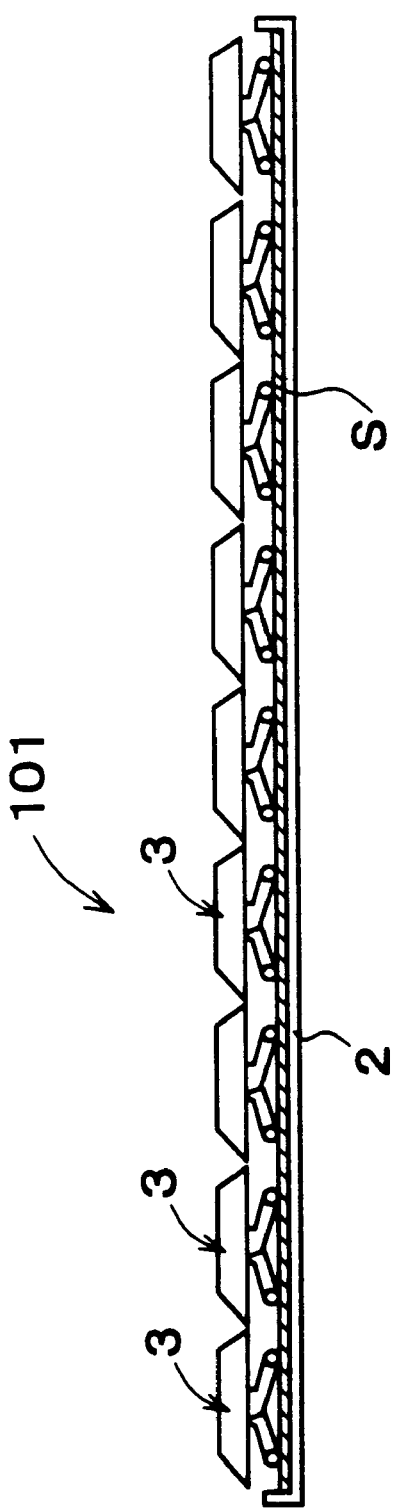
FIG. 18 is a schematic side view of a keyboard in a fourth preferred embodiment according to the present invention.
Figure 19:
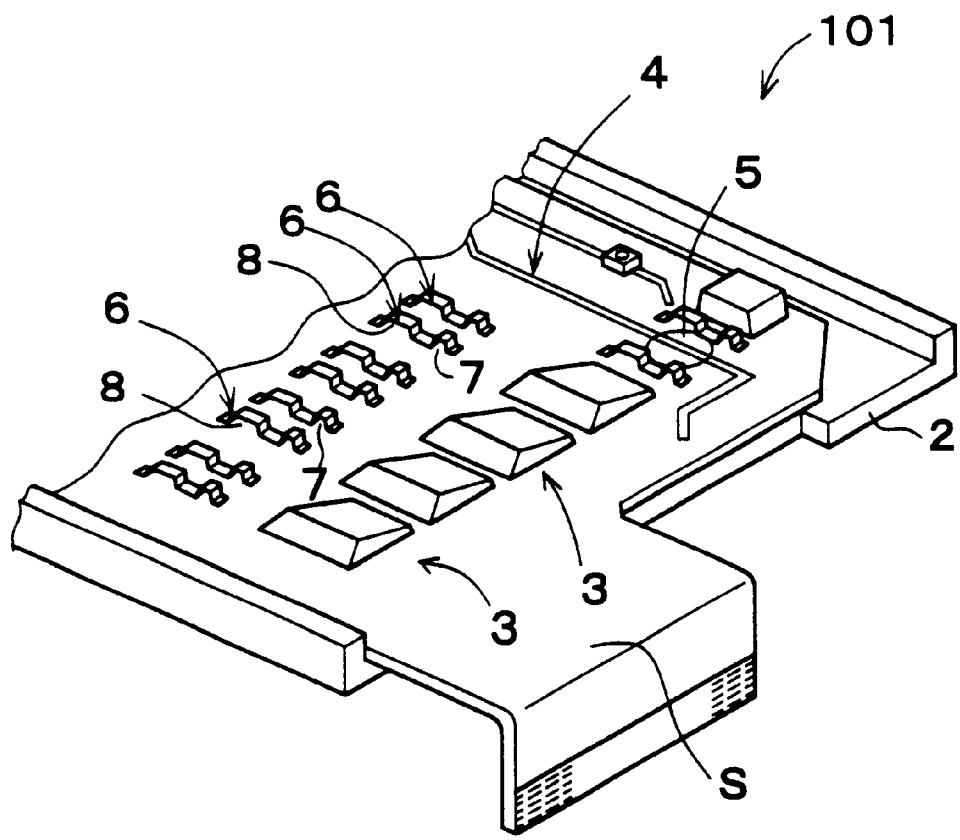
FIG. 19 is a schematic perspective partial view of the keyboard, where some of key tops of the key switch devices are omitted.

In FIGS. 18 and 19, the keyboard 101 is provided with a support plate 2 which is disposed between an upper and lower frames of a notebook-size personal computer and the like and a film sheet S made of polyethylene terephthalate (PET) disposed on the support plate 2 (or an upper surface of the lower case), and a plurality of the key switch devices 3 arranged in the longitudinal and transverse directions of the plate 2. A predetermined circuit pattern 4 is formed on the upper surface of the PET film sheet S with use of a conductive ink and the like. A fixed contact pattern 5 is formed at a substantially center in each of the areas where the key switches 3 are disposed one-by-one on the circuit pattern 4.

In each of the areas associated with the key switch devices 3, a pair of mounting members 6 are fixed in parallel at a predetermined distance therebetween on the PET film sheet S with an adhesive. The paired mounting members 6 are identical in structure and one is explained below. The mounting member 6 is made in such a manner that linear metal such as aluminum or iron is worked into a predetermined shape and cut into a chip having the unit length of one key switch device 3. The mounting member 6 is so formed, like in the first embodiment, as to have a rotatably supporting portion 7 and a slidably supporting portion 8. The rotatably supporting portion 7 with a recess is so configured as to rotatably engage with a rotatable shaft 18 formed at a lower end of a first link 14 constructing a guide member 10 which guides the vertical movement of a key top 9. The slidably supporting portion 8 with an elongated recess is so configured as to slidably engage with a slidable shaft 20 formed at a lower end of a second link 15.

As an adhesive for fixing the mounting member 6 to the PET film sheet S, a commercially available adhesive which is usable for high-density packaging of various chip components is used. For instance, preferably used is an epoxy adhesive that is hardened in a short time and is excellent in heat-resistance to soldering, in electrical and mechanical properties, and in insulating properties. The mounting member 6 may be directly fixed on the PET film sheet S. Alternatively, it may be configured such that the PET film sheet S is first subjected to a pre-treatment to facilitate the adhesion of the adhesive to the sheet, an adhesive layer (for example, of UV ink and the like) suitable for the PET film sheet S is then formed thereon, and the adhesive is further applied onto the adhesive layer, so that the mounting member 6 is adhered on the adhesive layer with the adhesive.

Next, the structure of the key switch device 3 is described with reference to FIG. 20 which is a schematic side view of the key switch devices, a left one of which is shown in an exploded state. The key switch device 3 is mainly constructed of a key top 9, a guide member 10 for vertically movably supporting the key top 9, a rubber spring 11 disposed under the guide member 10 and over the fixed contact pattern 5 of the circuit pattern 4 formed on the PET film sheet, and. the pair of mounting members 6.

It is to be noted that each structure of the key top 9, the guide member 10, and the rubber spring 11, and the mounting member 6 are identical to those in the first embodiment. The detail explanation thereof is omitted.

The mounting member 6 having the same configuration as that in the first embodiment is fixed on the PET film sheet S such that a first adhering portion 21 is adhered on the PET film sheet S through a first adhesive layer 124 applied on the sheet S, a second adhering portion 22 is adhered through a second adhesive layer 125, a third adhering portion 23 is adhered through a third adhesive layer 126 applied on the sheet S. Accordingly, the mounting member 6 is adhered and fixed on the upper surface of the PET film sheet S.

Figure 23:
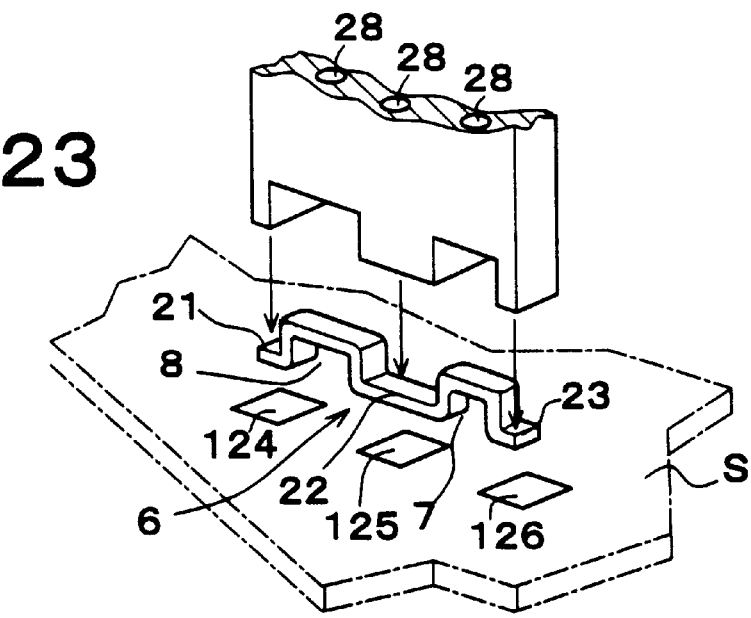
FIG. 23 is a perspective view of a mounting member when fixed on a PET film sheet with use of a suction head.

This mounting member 6 is fixed on the PET film sheet S in the following manner; the PET film sheet S which has been formed into a predetermined shape is first set in a predetermined position; then, the first, second, and third adhesive layers 124, 125, and 126 are applied. to the PET film sheet S in each position corresponding to the key switch device 3 by a known automatic adhesive applying device. With an automatic mounting device loading the mounting member 6 chipped as above, as shown in FIG. 23, the mounting member 6 stuck to a suction head 27 under suction through suction holes 28 is placed such that the first, second, and third adhering portions 21, 22, and 23 correspond to the first, second, and third adhesive layers 124, 125, and 126, respectively, and then the mounting member 6 is pressed onto the PET film sheet S by the suction head 27 at a predetermined pressure. The mounting member 6 is thus adhered and fixed on the sheet S in a predetermined position through the first through third adhesive layers 124, 125, and 126. The underside of the suction head 27 has a shape corresponding to the shape of the mounting member 6 as shown in FIG. 23, so that the head 27 can securely press the mounting member 6 to the first, second, and third adhesive layers 124–126 respectively.

The operation of the key switch device 3 having the above construction is explained below.

When the key top 9 is depressed, the slidable shaft 17 of the first link 14 is slid horizontally (leftward in FIG. 20) in the connecting portion 12 of the key top 9 and, simultaneously, the rotatable shaft 18 is rotated counter-clockwise in the rotatably supporting portion 7 of the mounting member 6. At the same time, the rotatable shaft 19 of the second link 15 is rotated clockwise in the connecting portion 13 of the key top 9 and, simultaneously, the slidable shaft 20 is slid horizontally (leftward in FIG. 20) in the supporting portion 8 of the mounting member 6. The fulcrum portion 16 connecting the first and second link 14 and 15 is accordingly lowered to gradually depress the rubber spring 11. When the amount of depression of the rubber spring 11 exceeds a certain limit, the rubber spring 11 is buckled. As a result, the movable contact provided on the internal upper wall of the rubber spring 11 is made into contact with the fixed contact pattern 5 of the circuit pattern 4, thus effecting a switching operation.

When the depression force applied to the key top 9 is removed, the fulcrum portion 16 of the first and second links 14 and 15 is lifted by an elastic restoring force of the rubber spring 11. In association therewith, the shafts 17 and 18 of the first link 14 and the shafts 19 and 20 of the second link 15 are operated reversely to the above, and thus the key top 9 is returned to the original position shown in FIG. 20.

The key switch device 3 in the fourth embodiment is constructed such that the mounting member 6 is fixed on a single sheet of PET film S disposed on the support plate 2, through an adhesive, but it may be modified as viewed in FIG. 21.

FIG. 21 is a schematic side view of an alternative of the key switch 3 in the fourth embodiment. In FIG. 21, a membrane switch sheet MS having a three-layer configuration is disposed on the support plate 2. This membrane switch sheet MS is constructed of an upper PET film sheet S1, a lower PET film sheet S2, and a spacer sheet S3 disposed between the upper and lower sheets S1 and S2. The lower PET film sheet S2, having the same structure as that of the PET film sheet S in the fourth embodiment, is provided with a circuit pattern 4 and a fixed contact pattern 5 on the upper surface of the sheet S2. The upper PET film sheet S1 is provided with a movable contact pattern (not shown) disposed in a position opposite to the fixed contact pattern 5. The spacer sheet S3 serves to separate the upper and lower sheets S1 and S2 and is provided with a switching hole 29 at a position where the fixed contact pattern 5 of the lower sheet S2 is opposite to the movable contact pattern of the sheet S1.

On the upper surface of the upper PET film sheet S1 of the membrane switch sheet MS constructed as above, the mounting member 6 is fixed in the above mentioned manner as shown in FIG. 21.

It is to be noted that the switching operation of the key switch device 3 is effected by contact and separation between the movable contact pattern of the upper sheet S1 and the fixed contact circuit 5 of the lower sheet S2. Accordingly, no movable contact is provided on the internal upper wall of the rubber spring 11 disposed on the upper PET film sheet S1.

When the key top 9 of the key switch device 3 (shown in FIG. 21) in the alternative of the fourth embodiment is depressed, the slidable shaft 17 of the first link 14 is slid horizontally (leftward in FIG. 21) in the connecting portion 12 of the key top 9 and, simultaneously, the rotatable shaft 18 is rotated counterclockwise in the rotatably supporting portion 7 of the mounting member 6. At the same time, the rotatable shaft 19 of the second link 15 is rotated clockwise in the connecting portion 13 of the key top 9 and, simultaneously, the slidable shaft 20 is slid horizontally (leftward in FIG. 21) in the supporting portion 8 of the mounting member 6. The fulcrum portion 16 connecting the first and second links 14 and 15 is accordingly lowered to gradually depress the rubber spring 11. When the amount of depression of the rubber spring 11 exceeds a certain limit, the rubber spring 11 is buckled. As a result, the internal upper wall of the rubber spring 11 depresses the upper PET film sheet S1 from above and causes the movable contact pattern provided on the underside of the sheet S1 to come into contact with the fixed contact pattern 5 formed on the upper surface of the sheet S2, thus effecting a predetermined switching operation.

When the depression force applied to the key top 9 is removed, on the other hand, the fulcrum portion 16 of the first and second links 14 and 15 is lifted by an elastic restoring force of the rubber spring 11. In association therewith, the shafts 17, 18 of the first link 14 and the shafts 19, 20 of the second link 15 are operated reversely to the above, and thus the key top 9 is returned to the original position shown in FIG. 21.

Figure 24:
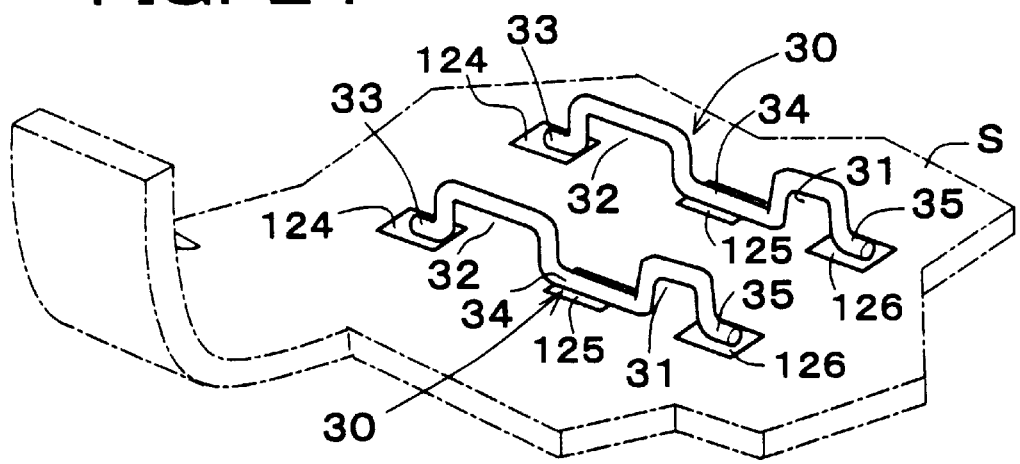
FIG. 24 is a perspective view of mounting members fixed on a PET film sheet in a key switch device in a fifth preferred embodiment according to the present invention.

Next, a key switch device in a fifth preferred embodiment according to the present invention will now be described with reference to FIG. 24. The key switch device in this embodiment has substantially the same structure as in the fourth embodiment, except that the mounting member 6 in the fifth embodiment is made of a needle-like linear material, which is different from the mounting member 6 in the fourth embodiment made of a flat linear material. Accordingly, parts identical to those of the fourth embodiment are indicated at the same reference numerals. The following description is focused on the feature of the key switch device in the fifth embodiment. FIG. 24 is a perspective view of mounting members fixed on a PET film sheet S in a key switch device in the fifth preferred embodiment.

In FIG. 24, a mounting member 30, which is identical to that in the above second embodiment, has a first, second, and third adhering portions 33, 34, and 35. These first, second, and third adhering portions 33, 34, and 35 of the mounting member 30 are adhered and fixed on a PET film sheet S through a first, second, and third adhesive layers 124, 125, and 126, respectively, applied on the PET film sheet S. As a result, the mounting member 30 is adhered and fixed on the PET film sheet S.

The mounting member 30 is fixed on the PET film sheet S in the following manner; the PET film sheet S which has been formed into a predetermined shape is first set in a predetermined position; then, the first, second, and third adhesive layers 124, 125, and 126 are applied to the sheet S in respective positions within the area corresponding to the key switch device 3 by a known automatic adhesive applying device. With an automatic mounting device loading the mounting member 30 chipped as above, the mounting member 30 stuck to a mounting head (not shown) under suction is placed such that the first, second, and third adhering portions 33, 34, and 35 correspond to the first, second, and third adhesive layers 124, 125, and 126, respectively. Then, the mounting member 30 is pressed onto the PET film sheet S by the mounting head at a predetermined pressure. The mounting member 30 is thus adhered and fixed on the sheet S in a predetermined position through the first through third adhesive layers 124, 125, and 126.

Figure 25:
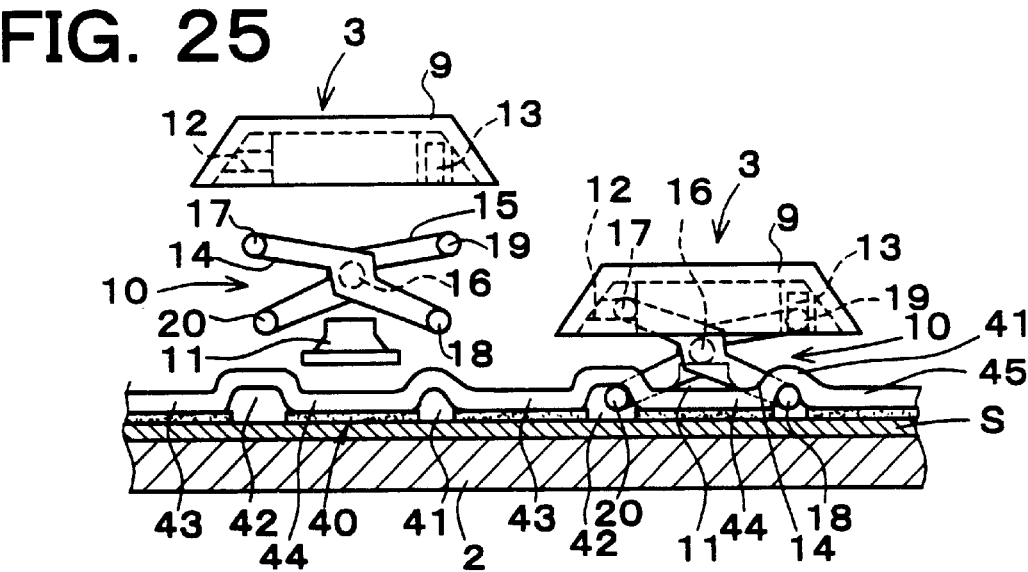
FIG. 25 is a schematic side view of key switch devices in a sixth preferred embodiment according to the present invention, one of which is shown in an exploded state.

Next, a key switch device in a sixth preferred embodiment according to the present invention will be described with reference to FIG. 25. The key switch device in this embodiment has substantially the same structure as in the fourth and fifth embodiments, except that the mounting member in the sixth embodiment is so configured as to have a length corresponding to a plurality of key switch devices aligned in a row on a PET film sheet in the longitudinal and transverse directions, while the mounting members 6 and 30 in the fourth and fifth embodiments are chipped in correspondence to the unit length of the key switch device 3. Accordingly, parts identical to those of the fourth and fifth embodiments are indicated at the same reference numerals. The following description is focused on the feature of the key switch device in the sixth embodiment. FIG. 25 is a perspective side view of a key switch device in the sixth embodiment.

In FIG. 25, the key switch device 3 is mainly constructed of, like in the above embodiments, a key top 9, a guide member 10 for supporting the key top 9 so as to allow the vertical movement of the key top 9, a rubber spring 11 disposed under the guide member 10 and over a fixed contact pattern 5 of a circuit pattern 4 formed on a PET film sheet, and a pair of mounting members 40 (only one of which is shown in FIG. 25).

The mounting member 40 is formed with a length covering a plurality of key switch devices 3 arranged on the PET film sheet S as shown in FIG. 25. The mounting member 40 has, in each of the portions which are in one-to-one correspondence with the key switch devices 3, a rotatably supporting portion 41 for rotatably supporting a rotatable shaft 18 of a first link 14 and a slidably supporting portion 42 for slidably supporting a slidable shaft 20 of a second link 15. In such the long mounting member 40 as shown in FIG. 25, for example, the part existing between the slidably supporting portion 42 associated with the right key switch device 3 and the rotatably supporting portion 41 associated with the left key switch device 3 is a first adhering portion 43, and the part existing between the supporting portions 41 and 42 for one key switch device 3 is a second adhering portion 44. The part formed continuing from the supporting portion 41 associated with the key switch device 3 positioned in one end of the mounting member 40 (for example, in a right end in FIG. 25) is a third adhering portion 45. It is to be noted that the number of key switch devices 3 associated to the mounting member 40 can optionally be determined according to various specifications for the keyboard 101.

Figure 22:
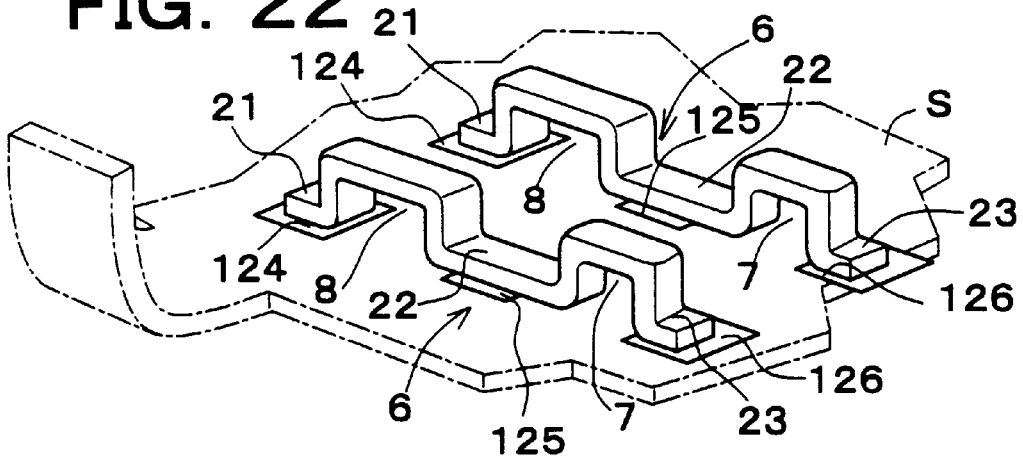
FIG. 22 is a perspective view of mounting members fixed on a PET film sheet of the key switch device in the fourth embodiment.

The first, second, and third adhering portions 43, 44, and 45 of the mounting member 40 are adhered and fixed on the PET film sheet S through the first, second, and third adhesive layers 124, 125, and 126. (see FIGS. 22 and 24), respectively. The mounting member 40 is thus adhered and fixed on the PET film sheet S.

The mounting member 40 is produced by continuously drawing a part of a flat linear material from a roll thereof and molding it into a predetermined shape, and cutting it by the length corresponding to a plurality of the key switch devices 3. The thus produced mounting member 40 is fixed on the PET film sheet S in the following manner, like in the above embodiments; the PET film sheet S which has been formed into a predetermined shape is first set in a predetermined position; then, the first, second, and third adhesive layers 124, 125, and 126 are applied to the PET film sheet S in respective positions within the area corresponding to the key switch device 3 by a known automatic adhesive applying device. With an automatic mounting device loading the long mounting member 40, the mounting member 40 being held in the mounting device is placed such that the first, second, and third adhering portions 43, 44, and 45 correspond to the first, second, and third adhesive layers 124, 125, and 126, respectively, and then the mounting member 40 is pressed onto the PET film sheet S by a mounting head at a predetermined pressure. The mounting member 40 is thus adhered and fixed in a predetermined position on the PET film sheet S through the first through third adhesive layers 124, 125, and 126.

Although each of the mounting members 6, 30, 40 in the fourth, fifth, and sixth embodiments is adhered and fixed on the PET film sheet S through the first, second, and third adhesive layers 124, 125, and 126, those mounting members 6, 30, and 40 may be fixed on the PET film sheet S with use of various fixing manners besides the above-mentioned adhering manner with an adhesion.

In the key switch device 3 in the fourth, fifth, and sixth embodiments described above, each of the mounting members 6, 30, and 40 has the rotatably supporting portion 7 (or 31 or 41) which rotatably supports the rotatable shaft 18 formed at the lower end of the first link 14 of the guide member 10 and the slidably supporting portion 8 (or 32 or 42) which slidably supports the slidable shaft 20 formed at the lower end of the second link 15, and the mounting member is fixed on the PET film sheet S through the first, second, and third adhesive layers 124, 125, and 126. Alternatively, the key switch device 3 is constructed such that the mounting member 6 is adhered and fixed on the upper PET film sheet S1 constituting the membrane switch sheet MS through the first, second, and third adhesive layers 124, 125, and 126. Accordingly, there is no need for forming supporting portions in the support plate and an expensive pressing die is no longer needed, thus enabling the reduction of manufacturing cost of the keyboard 101. Since the need for producing such a die is eliminated, the manufacture can be started earlier.

Even if the specifications of the keyboard 101 provided with a plurality of the key switch devices 3 are different according to countries, it is sufficient to fix the mounting member 6 (30, 40) on the PET film sheet S through the adhesive layers 124, 125, and 126 in response to the specifications on a country-to-country basis. This can increase the design flexibility of the keyboard 101 having the key switch devices 3 without preparation of a pressing die for the different specifications on a country-to-country basis.

In the key switch device 3 in the fourth and fifth embodiments, the mounting member 6 (30) fixed on the PET film sheet S is formed in a chip having a unit length of a key switch device 3. As a result, the design flexibility of the keyboard 101 having a plurality of the key switch devices 3 can be further increased when the key switch devices 3 are manufactured so as to satisfy different specifications thereof on a country-to-country basis.

In the sixth embodiment, the mounting member 40 is so designed as to have the length corresponding to a plurality of the key switch devices 3 disposed on the PET film sheet S so that the shafts 18 of the first links 14 and the shafts 20 of the second links 15 are rotatably or slidably supported. The mounting member 40 is fixed through the adhesive layers 124, 125, and 126 in correspondence to each of rows of the key switch devices 3. Accordingly, the number of adhering steps for fixing the mounting member 40 to the PET film sheet S can be decreased, thus reducing the cost of the key switch device 3.

It is to be noted that the invention is not limited to the above preferred embodiment but various modifications and changes may be made without departing from the scope of the invention.

For example, the mounting member 6 (30, 40) of the key switch device 3 in the fourth to sixth embodiments is made of linear metal and, instead thereof, may be made of linear resin. In case of the use of linear resin, as the adhesive to adhere the mounting member 6 (30, 40) on the PET film sheet S, an adhesive suitable for both of the PET film sheet and the resin forming the mounting member is preferably selected.

Figure 26:
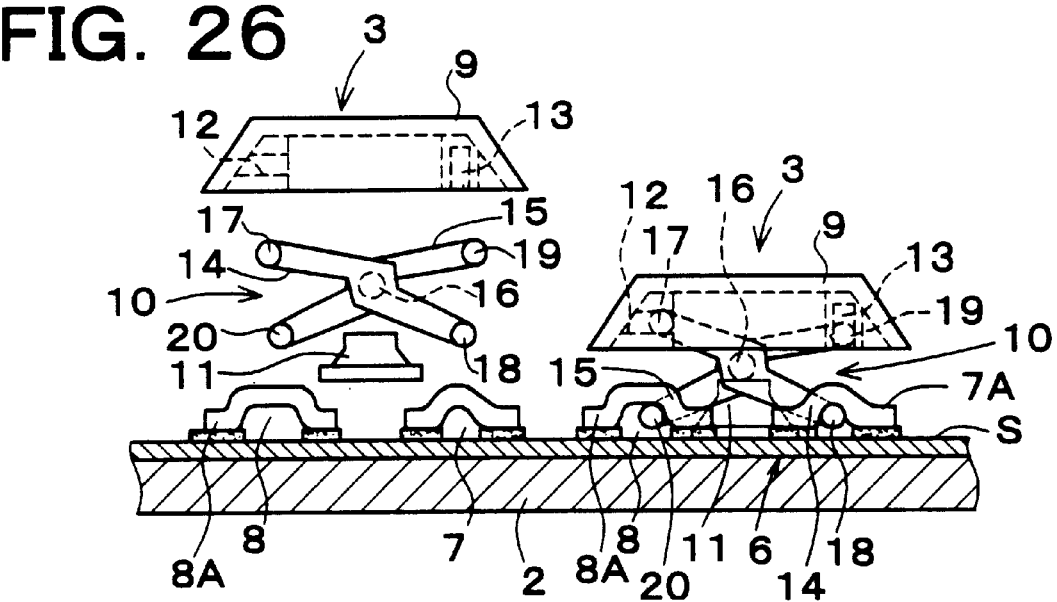
FIG. 26 is a side view of an alternative of the key switch devices in the fourth embodiment.

Although the mounting member 6 of the key switch device 3 in the fourth embodiment is formed in a chip having the unit length of one key switch device 3, the mounting member 6 may alternatively be formed of two separate supporting portions 7A and 8A as shown in FIG. 26. When the mounting member 6 is constructed of the separately formed supporting portions 7A and 8A, the forming pattern of the adhesive layers applied onto the PET film sheet S are required changing in correspondence to the separate portions 7A and 8A.

Figure 27:
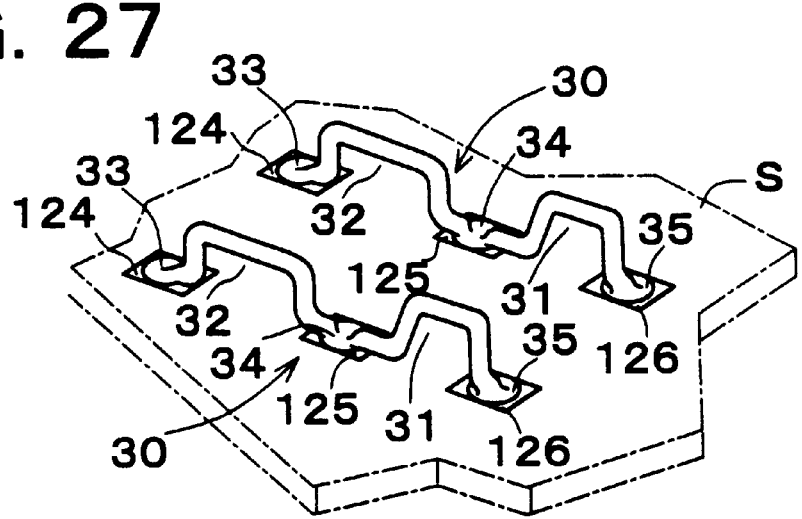
FIG. 27 is a perspective view of an alternative of the key switch devices in the fifth embodiment, schematically showing a fixing state of mounting members on the PET film sheet.

Although the mounting member 30 of the key switch device 3 in the fifth embodiment is made of a needle-like material, the first, second, and third adhering portions 33, 34, and 35 which are associated with the adhesive layers 124, 125, and 126 respectively may be shaped like a flat plate as shown in FIG. 27. In this case, the adhering area of the adhering portions 33, 34, and 35 to the adhesive layers 124, 125, and 126 are extended, so that the mounting member 30 can be firmly and securely fixed on the PET film sheet S.

Although the mounting member 6 in the fourth embodiment is provided with the first, second, and third adhering portions 21, 22, and 23 and the supporting portions 7 and 8 which are formed between the adhering portions, the mounting member 6 may be alternatively modified as below.

Figure 28:
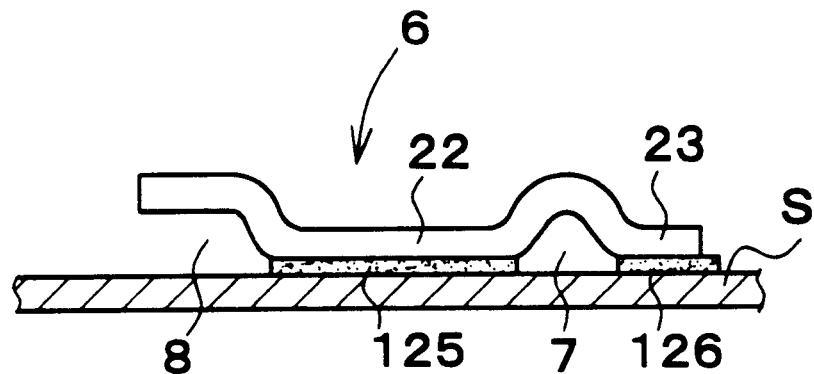
FIG. 28 is a side view of a first alternative of the mounting member in the fourth embodiment.

A first alternative of the mounting member 6 may have a supporting portion 8 opening at one side (the left side in FIG. 28) and no first adhering portion 21.

Figure 29:
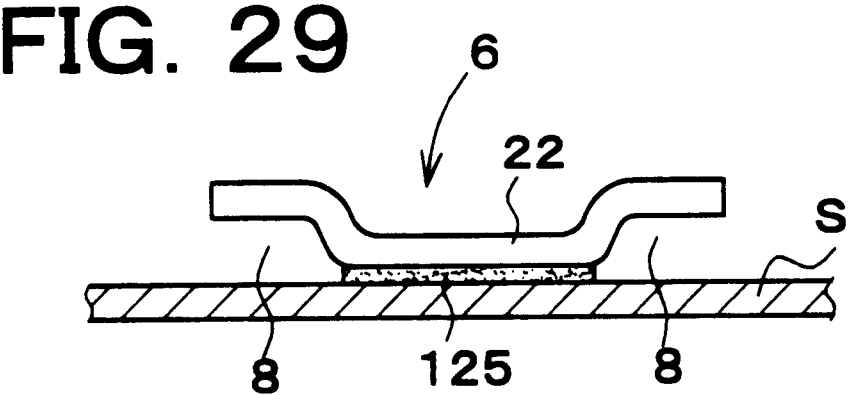
FIG. 29 is a side view of a second alternative of the mounting member in the fourth embodiment.

A second alternative of the mounting member 6 may have the supporting portions 8 opening at opposite sides and no first and third adhering portions 21 and 23, as shown in FIG. 29. It is to be noted that the forming pattern of the adhesive layers are needed changing according to those alternatives. In this case, like the shaft 20 of the second link 15, the shaft 18 of the first link 14 is also slid in the shaft 8.

Figure 30:
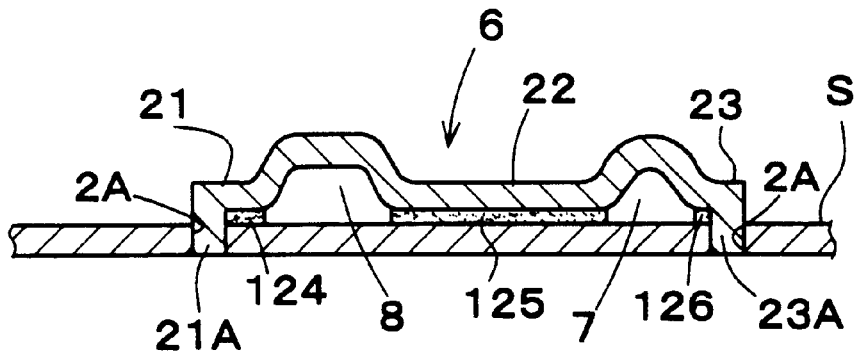
FIG. 30 is a sectional view of a third alternative of the mounting member in the fourth embodiment.

A third alternative of the mounting member 6 may have the first and third adhering portions 21 and 23 provided with end portions 21A and 23A which are bent downward as shown in FIG. 30 and function of positioning the mounting member 6 in place. When these end portions 21A and 23A are inserted in holes 2A formed in the PET film sheet S, the mounting member 6 can be placed in a predetermined position on the PET film sheet S.

Figure 31:
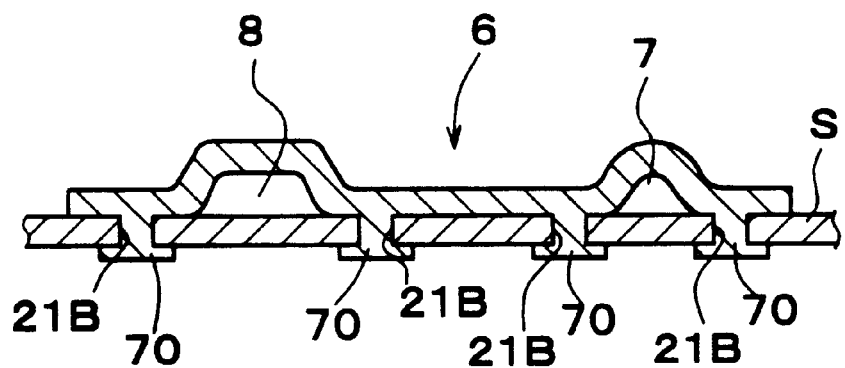
FIG. 31 is a sectional view of a fourth alternative of the mounting member in the fourth embodiment.

In a fourth alternative of the key switch device 3 in the fourth embodiment, as shown in FIG. 31, the mounting member 6 may integrally have projections 70 formed at both lower ends of the slidably supporting portion 8 and both lower ends of the rotatably supporting portion 7, respectively. These projections 70 penetrate through fixing holes 21B of the PET film sheet S, and the sheet S is subjected to annealing at about 150° C. This PET film sheet S is shrunk by the annealing. As a result, the projections 70 are firmly secured in the holes 21B, thereby fixing the mounting member 6 on the PET film sheet S. In this alternative, the use of an adhesive can be eliminated.

Figure 32:
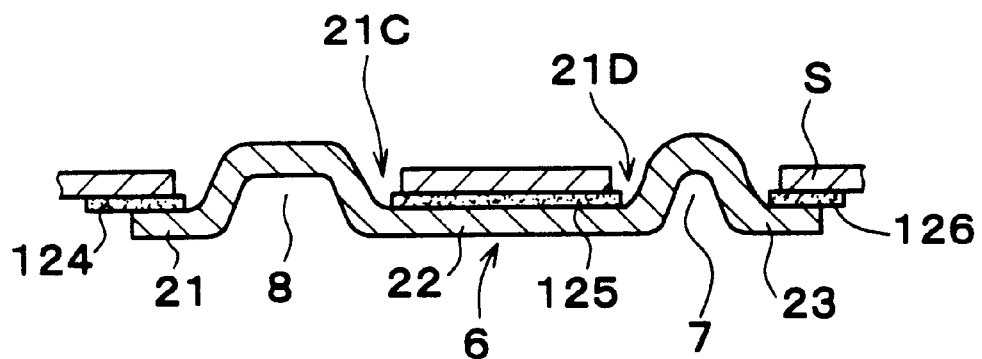
FIG. 32 is a sectional view of an alternative of the PET film sheet in the fourth embodiment.

Furthermore, in an alternative of the PET film sheet of the key switch device 3 in the fourth embodiment, as shown in FIG. 32, the PET film sheet S is provided with through holes 21C and 21D and a first, second, and third adhering layers 124, 125, and 126 on the underside of the sheet S. The mounting member 6 is disposed under a PET film sheet S such that the supporting portions 7 and 8 are upwardly inserted in the through holes 21D and 21C respectively, and the first, second, and third adhering portions 21, 22, and 23 are adhered to the first, second, and third adhesive layers 124, 125, and 126 respectively. As a result, the mounting member 6 is adhered and fixed on the underside of the PET film sheet S. Since the supporting portions 7 and 8 are inserted in the through holes 21D and 21C, the mounting member 6 will not easily be separated from the PET film sheet S.

Figure 33:
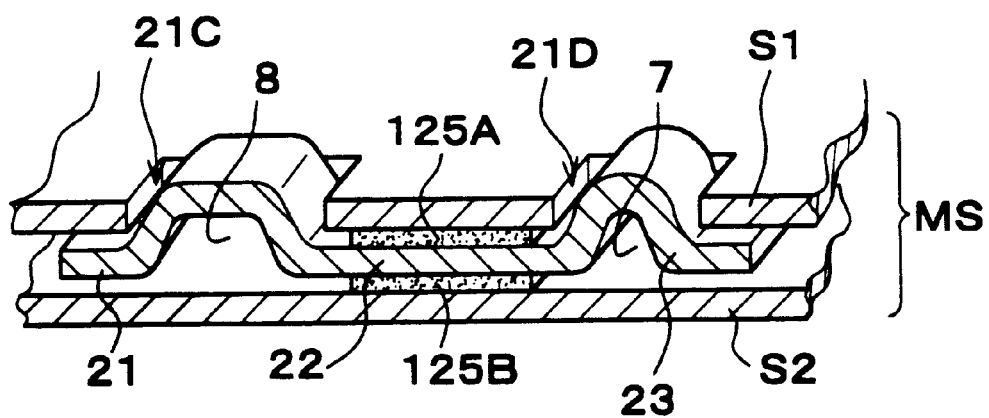
FIG. 33 is a perspective sectional view of an alternative of the PET film sheet in the fourth embodiment.

In an alternative of the PET film sheet of the key switch device 3 in the fourth embodiment, as shown in FIG. 33, the upper PET film sheet S1 of the membrane switch sheet MS is provided with through holes 21C and 21D and applied with a second adhesive layer 125A on the underside of the sheet S1 and a second adhesive layer 125B on the upper surface of the sheet S2 opposite to the adhesive layer 125A. The mounting member 6 is disposed under the upper PET film sheet S1 such that the supporting portions 7 and 8 of the mounting member 6 are upwardly inserted in the through holes 21D and 21C respectively. The lower PET film sheet S2 is made contact under pressure with the upper PET film sheet S1. As a result, the second adhering portion 22 of the mounting member 6 is adhered and fixed between the upper and lower PET film sheets S1 and S2 through the second adhesive layers 125A and 125B. Thus, the mounting member 6 is sandwiched between the PET film sheets S1 and S2 with the supporting portions 7 and 8 inserted in the through holes 21D and 21C respectively, so that the mounting member 6 will not be easily separated from the PET film sheet S. In addition, the first, second, and third adhering portions 21, 22, and 23 having a predetermined thickness can function as a spacer sheet S3. The use of the spacer sheet S3 can be eliminated accordingly.

Next, description will be made on a portable electronic device provided with key switch devices in a seventh to tenth embodiments according to the present invention. The portable electronic device is embodied in a notebook-size personal computer shown in FIG. 34.

As shown in FIG. 34, this notebook-size personal computer (which is simply referred to as 'computer', hereinafter) 201 is provided with a keyboard 203 having key switch devices constructed as described in the above embodiments to instruct various operations of the computer, a liquid crystal display 205 which visually displays calculation results obtained in a central processing unit (CPU; not shown), a power cord 207 through which electric power is supplied from an external power source to the computer 201, and a sheet-type secondary battery 209 (see FIG. 35) which will be mentioned later in detail, and others. It is to be noted that the internal structure of the computer 201 has been known and the detail explanation thereof is omitted.

Figure 36:
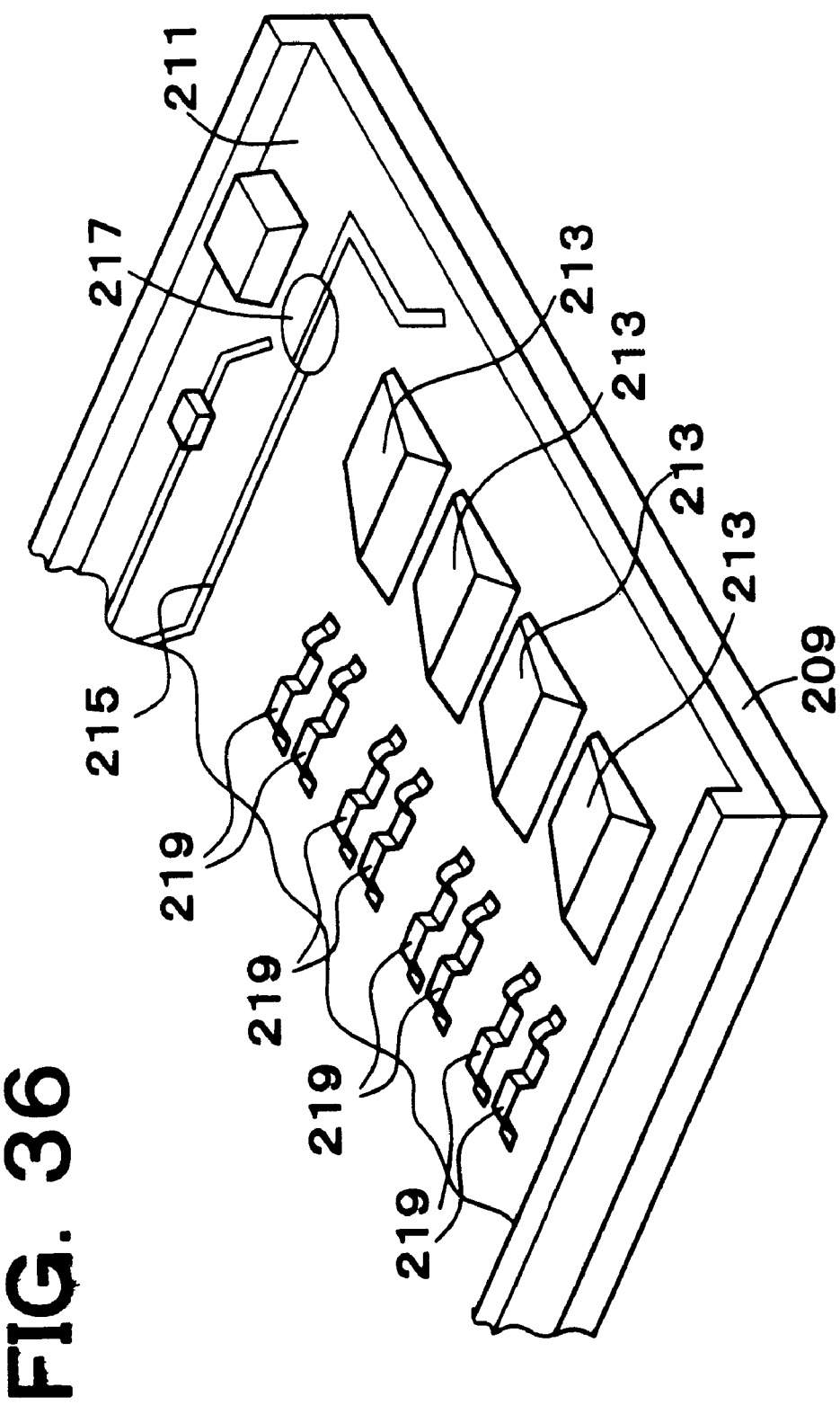
FIG. 36 is a perspective view of a part of the keyboard and the secondary battery in the seventh embodiment.

FIG. 35A is a schematic side view of the keyboard 203 and the sheet-type secondary battery 209 built in the computer 201 in the seventh embodiment. FIG. 35B is an enlarged view of the circled part B in the FIG. 35A. FIG. 36 is a schematic perspective view of the keyboard 203 and the sheet-type secondary battery 209 in the seventh embodiment. This battery 209 is rechargeable through the power cord 207 from an external electric power source and can supply electric power to the computer 201 to activate it even if no power is supplied from the external power source. Accordingly, the computer 201 can be used in a place such as outdoors where the power supply from the external power source is impossible.

The keyboard 203 is constructed of a thin metal plate 211 made of aluminum and a plurality of key switches 213 disposed on the metal plate 211 in the longitudinal and transverse directions. The key switch 213 is provided with cross-linked legs 214 for permitting the vertical movement of the key switch 213. The lower ends of the legs 214 are movably supported on the metal plate 211 with mounting members mentioned later. On the upper surface of the metal plate 211, there is provided an insulating resist layer not shown. A predetermined circuit pattern 215 is further provided on the insulating resist layer with the use of an electric conductive ink and the like. This circuit pattern 215 is used to detect whether or not the key switch has been depressed. A fixed contact pattern 217 is formed on the circuit pattern 215 at a substantially center within the area associated with each key switch 213.

A pair of mounting members 219 is fixed with an adhesive and the like on the upper surface of the metal plate 211 in each position where the key switch 213 is disposed. With the mounting members 219 supporting the legs 214, a plurality of the key switches 213 are disposed on the metal plate 211. It is to be noted that the mounting member 219 is made of linear metal such as aluminum or iron into a predetermined shape and cut into a chip having the unit length of one key switch 213. As an adhesive for adhering the mounting member 219 on the metal plate 211, a commercially available adhesive which is usable for high-density packaging of various chip components is used. For instance, preferably used is an epoxy adhesive that is hardened in a short time and is excellent in heat-resistance to soldering, in electrical and mechanical properties, and in insulating properties. The mounting member 219 may be directly fixed on the metal plate 211 or fixed on the insulating resist layer. It is to be noted that if the mounting member 219 is directly fixed on the metal plate 211, the insulating resist layer is not provided on the portions of the metal plate 211 where the mounting member 219 is to be adhered. The mounting member 219 is thus fixed, with an adhesion, directly on the metal plate 211 in the portions uncoated with the insulating resist layer.

On the other hand, the secondary battery 209 which has substantially the same surface area as that of the metal plate 211 is closely fixed to the opposite surface of the metal plate 211 to the surface mounting thereon the key switches 213, with an adhesive and the like. This battery 209 is constructed of a positive electrode 220, a negative electrode 222, and an insulating member 221 which is an electrolyte disposed between the positive and negative electrodes 220 and 222 so that they are placed in layers, a positive electrode collecting member 218 provided on the positive electrode 220, a negative electrode collecting member 223 provided on the negative electrode 222, and a jacket member 216 which envelops the above elements. Through those positive and negative electrode collecting members 218 and 223, the supply of electric power to the computer 201 or the charge of the battery 209 from the external power source and the power cord 217 is effected.

A combination of the elements constituting the secondary battery 209 is variously conceivable. As an example, the jacket member 216 made of an aluminum-evaporated film, the positive electrode 220 made of cobaltic acid lithium, and the negative electrode 222 made of copper foil can be combined to form the secondary battery 209. In particular, solid polyelectrolyte is preferably used for the insulating member 221. If the area and the thickness of the sheet-type secondary battery 209 is appropriately adjusted, the battery 209 with a desired capacity can be obtained. In the present embodiment, the battery 209 is so configured as to have a substantially equal area to the surface area of the metal plate 211 and a thickness adjusted according to the capacity needed for the computer 201. Currently, such the sheet-type secondary battery 209 is presented in various forms each having a thickness in a range of 0.3 mm (ultra-thin type) to 20 mm and an area in a range of 5 mm square (ultra-compact size) to an A5-size (large size). Since the capacity of the battery can be changed according to the area and thickness, the sheet-type secondary battery 209 can be appropriately selected in response to using purposes.

All of the inside elements of the sheet-type secondary battery 209 constructed as above are solid, including the insulating member 221 which is solid polyelectrolyte. Accordingly, there is no possibility of leaking which may be caused in the case of overcharge when liquid electrolyte is used as an insulating member.

The metal plate 211, to which the heat which generates in the secondary battery 209 in charging from the external power source is transmitted, is directly exposed to the air through clearances between the key switches 213, and thus the heat can be sufficiently dissipated. As result, the reliability and safety of the computer 201 can be improved.

Furthermore, the computer 201 is not required to have special structure or components for attachment of the sheet-type secondary battery 209, which can reduce the manufacturing cost.

Next, an electronic device provided with a sheet-type secondary battery in an eighth embodiment will be explained with reference to FIGS. 34 and 37. The sheet-type secondary battery and the notebook-size personal computer in the present embodiment have substantially the same structure as those in the seventh embodiment. Accordingly, parts identical to those of the seventh embodiment are indicated at the same reference numerals. The following description is focused on the feature of the electronic device provided with the sheet-type secondary battery in the eighth embodiment.

FIG. 37A is a schematic side view of the keyboard 203 and the sheet-type secondary battery 209 built in the computer 201 shown in FIG. 34. FIG. 37B is an enlarged view of the circled part B in the FIG. 37A. The battery 209 shown in FIG. 37A has substantially the same structure as that in the seventh embodiment, except that the battery 209 in the eighth embodiment has no jacket member in the upper side facing to the metal plate 211 and therefore the metal plate 211 functions as a negative electrode. Accordingly, with the positive electrode collecting member 218 and the metal plate 211, the battery 209 can supply power to the computer 201 or can be charged from the external power source through the power cord 207. Since the metal plate 211 can also be used as a negative electrode collecting member as mentioned above, the negative electrode collecting member 223 shown in FIG. 37 may be removed as required.

As mentioned above, the keyboard 203 and the sheet-type secondary battery 209 are made in a unitary configuration such that the elements constituting the battery 209 are disposed on one surface of the metal plate 211, while the keyboard 203 is disposed on another surface of the metal plate 211. Thus, the designer can design the computer 201 without considering the shape, arrangement position, and others of the secondary battery. The burdensome work to the designer can be reduced accordingly.

Since the metal plate 211 is also used as a negative electrode of the sheet type secondary battery 209, the metal plate 211 if used in a part of a box-like outer metal frame of the computer 201 can act as a static protection shield, which is very advantageous.

In addition, the keyboard 203 and the sheet-type secondary battery 209 are provided on the both surfaces of the metal plate 211 respectively, forming a unitary configuration. This eliminates the need for assembling the keyboard 203 and the sheet-type secondary battery 209 which are made as separate parts. As a result, the manufacturing steps and the number of parts can be decreased, and the manufacturing cost can be reduced. Since no superfluous space exists between the keyboard 203 and the battery 209, the computer 201 can be effectively reduced as a whole in weight and size.

Next, an electronic device in a ninth preferred embodiment will be described hereinafter with reference to FIGS. 34 and 38. The notebook-sized personal computer with the sheet-type secondary battery in the present embodiment has substantially the same structure as those in the seventh embodiment. Accordingly, parts identical to those of the seventh embodiment are indicated at the same reference numerals. The following description is focused on the feature of the electronic device provided with the sheet-type secondary battery in the ninth embodiment.

Figure 38A:
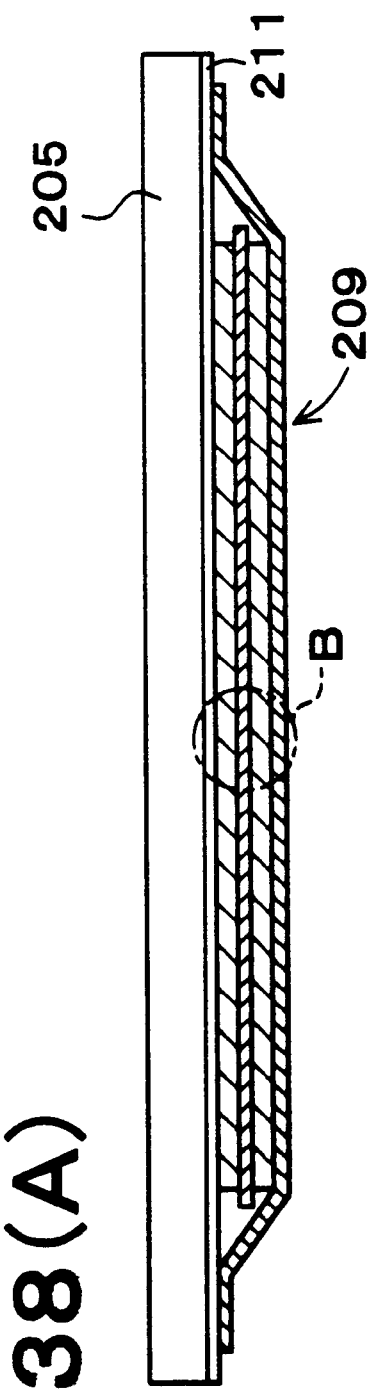
FIG. 38A is a side view of a liquid crystal display of a notebook-size personal computer provided with a sheet type secondary battery in a ninth preferred embodiment according to the present invention, the secondary battery being illustrated in a sectional view.
Figure 38B:
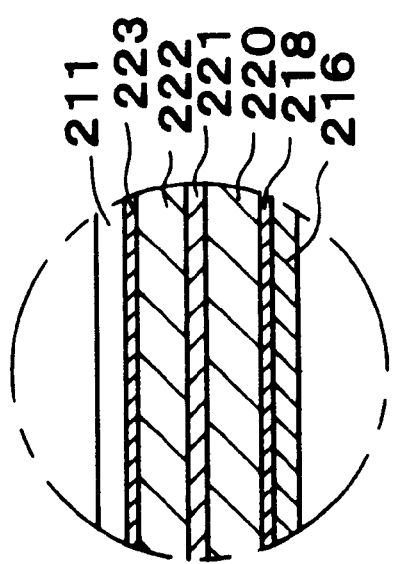
FIG. 38B is an enlarged view of a circled part B in FIG. 38A.

FIG. 38A is a schematic side view of a cover member of the notebook-size personal computer 201, which supports a crystal liquid display 205 shown in FIG. 34, including a sectional side view of the second battery mounted on the cover member. FIG. 38B is an enlarged view of a circled part B in the FIG. 38A.

The liquid crystal display 205 is disposed on a metal plate 211 made of a thin aluminum plate. On the back surface of the metal plate 211, opposite to the surface on which the liquid crystal display 205 is disposed, a sheet-type secondary battery 9 with substantially the same area as the surface area of the metal plate 211 is closely attached with an adhesive and the like. The battery 209 shown in FIG. 38A has substantially the same structure as that in the seventh embodiment, except that the battery 209 in the ninth embodiment has no jacket member in the upper side contacting the metal plate 211 and therefore the metal plate 211 functions as a negative electrode. Accordingly, with the positive electrode collecting member 218 and the metal plate 211, the battery 209 can supply power to the computer 201 or can be charged from the external power source through the power cord 207. Since the metal plate 211 can also be used as a negative electrode collecting member as mentioned above, the negative electrode collecting member 223 shown in FIG. 38 may be removed as required.

As mentioned above, the liquid crystal display 205 and the sheet-type secondary battery 209 are made in a unitary configuration such that the elements constituting the battery 209 are disposed on one surface of the metal plate 211, while the keyboard 203 is disposed on another surface of the metal plate 211. Thus, the designer can design the computer 201 without considering the shape, arrangement position, and others of the secondary battery. The burdensome work to the designer can be decreased accordingly.

In addition, the liquid crystal display 205 and the sheet-type secondary battery 209 are provided on the both surfaces of the metal plate 211 respectively, forming a unitary configuration. This eliminates the need for assembling the display 205 and the sheet-type secondary battery 209 which are made as separate parts. As a result, the manufacturing steps and the number of parts can be decreased, and the manufacturing cost can be reduced. Since no superfluous space exists between the display 205 and the battery 209, the computer 201 can be effectively reduced as a whole in weight and size.

Since the metal plate 211 is also used as a negative electrode of the sheet type secondary battery 209, the metal plate 211 if used in a part of a box-like outer metal frame of the computer 201 can act as a static protection shield, which is very advantageous.

Next, an electronic device in a tenth preferred embodiment will be described hereinafter with reference to FIGS. 34 and 39. The notebook-sized personal computer with the sheet-type secondary battery in the present embodiment has substantially the same structure as those in the seventh embodiment. Accordingly, parts identical to those of the seventh embodiment are indicated at the same reference numerals. The following description is focused on the feature of the electronic device provided with the sheet-type secondary battery in the tenth embodiment.

Figure 39A:
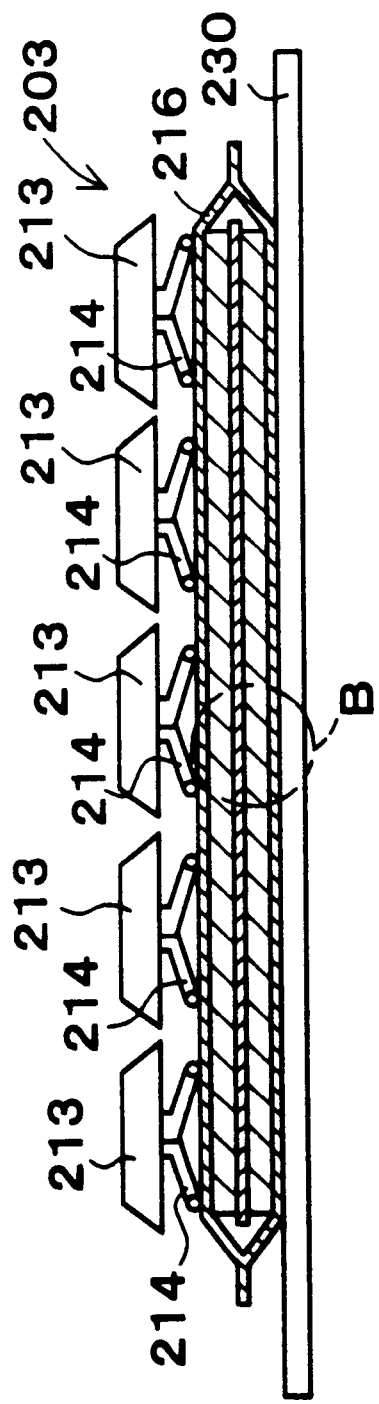
FIG. 39A is a side view of a keyboard and a sheet type secondary battery in a notebook-size personal computer in a tenth preferred embodiment according to the present invention, the secondary battery being illustrated in a sectional view.
Figure 39B:
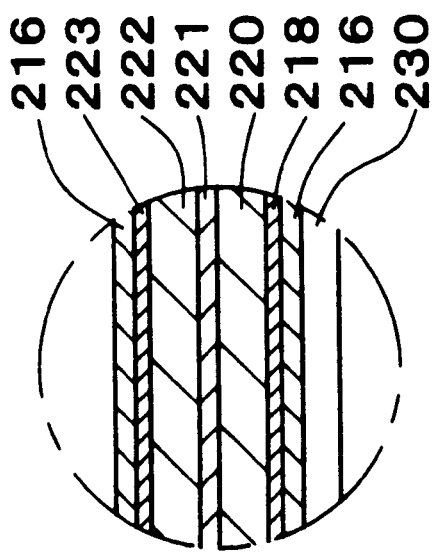
FIG. 39B is an enlarged view of a circled part B in FIG. 39A.
Figure 40:
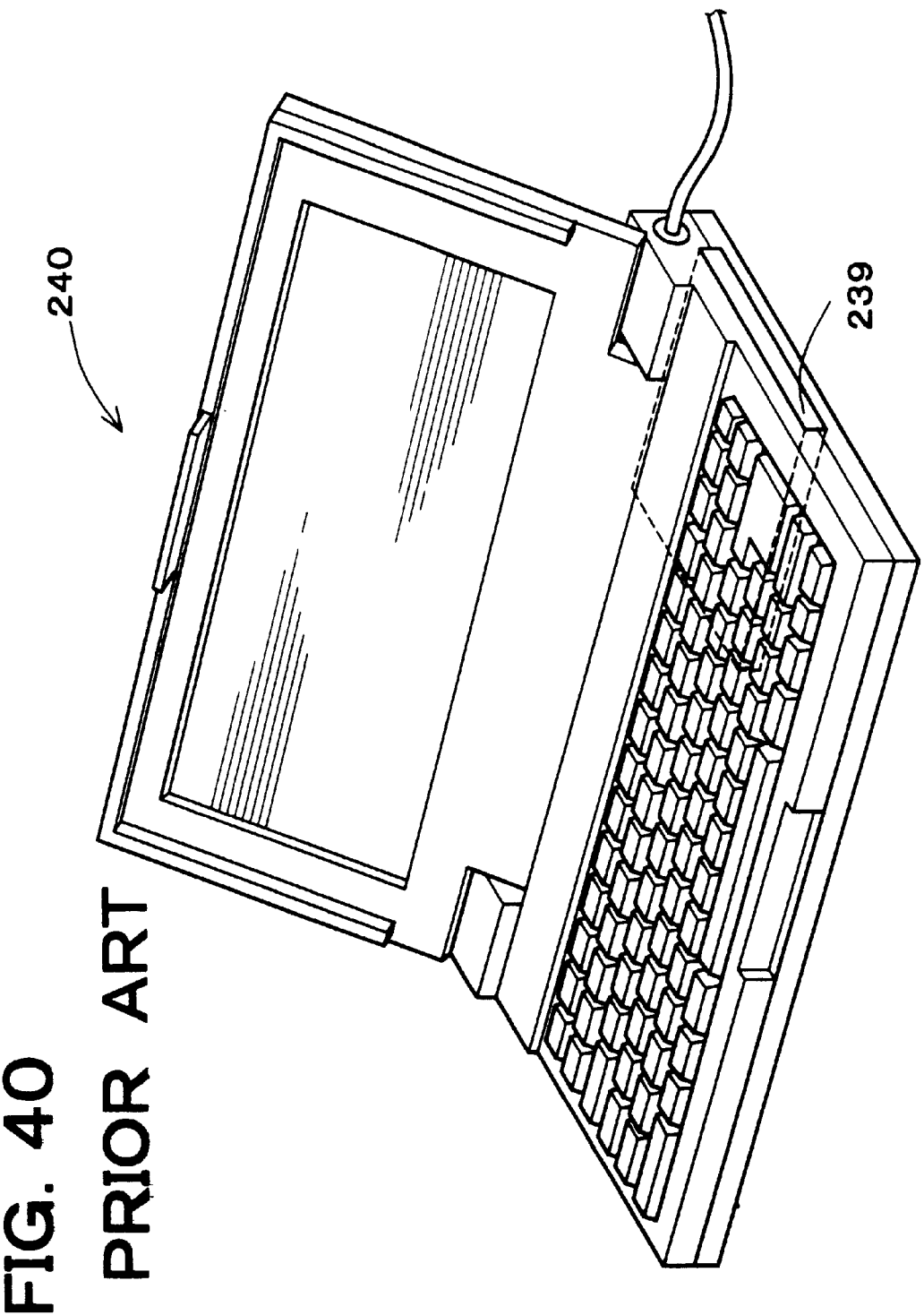
FIG. 40 is a perspective view of a notebook-size personal computer provided with a secondary battery in a prior art.

FIG. 39A is a schematic side view of the keyboard 203 and the sheet-type secondary battery 209 built in the computer 201 shown in FIG. 34. FIG. 39B is an enlarged view of a circled part B in the FIG. 39A. The battery 209 shown in FIG. 39A has substantially the same structure as that in the seventh embodiment, except that the battery 209 in the tenth embodiment has an insulating resist layer (not shown) applied on the upper surface of the jacket member 216, namely, the secondary battery 209. A predetermined circuit pattern is formed on the insulating resist layer by using a conductive ink and the like. Through the circuit pattern, a depression condition of each of the key switches 203 can be detected. Under the sheet-type secondary battery 209, there is provided a reinforcing plate 230 for preventing the battery 209 from being deformed or curved by when the key switches 203 are depressed.

The circuit pattern being formed on the jacket member 216 of the battery 209, the keyboard 203 and the sheet-type secondary battery 209 have no need for including a special member for supporting the circuit pattern, which is advantageous to reduction in size and cost of the computer 201.

In the above seventh to tenth embodiments, a notebook-sized personal computer provided with a sheet-type secondary battery is mentioned as an example of an electronic device according to the present invention. It is, however, needless to say that the same effect can be obtained if the present invention is applied to other portable electronic device, such as a word processor, provided with a keyboard or a crystal liquid display.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A key switch device including:

a key top;

a support plate disposed below the key top and having a switch pattern;

a guiding member which guides a vertical movement of the key top, provided with a first link and a second link which are mutually movably connected; and a switching section including the switch pattern, the switching section being disposed on the support plate and performing a switching operation in association with the vertical movement of the key top;

wherein the key switch device includes:

a first shaft formed at a lower end of the first link;

a second shaft formed at a lower end of the second link; and a mounting member for movably supporting the first and second shafts, the mounting member being formed independently from the support plate and into a chipped configuration, the chipped mounting member being disposed outside of the switching section on the support plate.

2. The key switch device according to claim 1, wherein the mounting member has at least a supporting portion which slidably supports one of the first and second shafts, the supporting portion being opened at an outer end thereof.

3. The key switch device according to claim 1, wherein the mounting member has supporting portions which movably support the first and second shafts, each supporting portion being opened at both outer ends.

4. A key switch device including:

a key top;

a support plate disposed below the key top;

a guiding member which guides a vertical movement of the key top, provided with a first link and a second link which are mutually movably connected;

a mounting member for movably supporting the first and second links; and a switching section which performs a switching operation in association with the vertical movement of the key top;

wherein the mounting member is formed independently from the support plate and into a chipped configuration, the chipped mounting member being disposed outside of the switching section on the support plate.

5. The key switch device according to claim 4, wherein the mounting member has at least a supporting portion which slidably supports one of the first and second links, the supporting portion being opened at an outer end thereof.

6. The key switch device according to claim 4, wherein the mounting member has supporting portions which movably support the first and second links, each supporting portion being opened at both outer ends.

7. A portable electronic device provided with a key switch, including:

a key top;

a support plate disposed below the key top;

a guiding member which guides a vertical movement of the key top, provided with a first link and a second link which are mutually movably connected;

a mounting member for movably supporting the first and second links; and a switching section which performs a switching operation in association with the vertical movement of the key top;

wherein the mounting member is formed independently from the support plate and into a chipped configuration, the chipped mounting member being disposed outside of the switching section on the support plate.

8. A keyboard provided with a key switch, including:

a key top;

a support plate disposed below the key top;

a guiding member which guides a vertical movement of the key top, provided with a first link and a second link which are mutually movably connected;

a mounting member for movably supporting the first and second links; and a switching section which performs a switching operation in association with the vertical movement of the key top;

wherein the mounting member is formed independently from the support plate and into a chipped configuration, the chipped mounting member being disposed outside of the switching section on the support plate.

9. A key switch device including:

a key top;

a support plate disposed below the key top;

a guiding member which guides a vertical movement of the key top, provided with a first link and a second link which are mutually movable connected;

a switching section including a membrane switch member disposed on the support plate, the membrane switch member having a switch pattern, and performing the switching operation in cooperation with the switch pattern of the membrane switch member in association with the vertical movement of the key top;

wherein the key switch device includes:

a first shaft formed at a lower end of the first link;

a second shaft formed at a lower end of the second link; and a mounting member for movably supporting the first and second shafts, the mounting member being formed independently from the support plate and into a chipped configuration, the chipped mounting member being disposed outside of the switching section on the membrane switch member.

10. A key switch device including:

a key top;

a support plate disposed below the key top;

a guiding member which guides a vertical movement of the key top, provided with a first link and a second link which are mutually movably connected;

a mounting member for movably supporting the first and second links; and a switching section which performs a switching operation in association with the vertical movement of the key top, the switching section including a membrane switch member disposed on the support plate and performing the switching operation in cooperation with the membrane switch member in association with the vertical movement of the key top;

wherein the mounting member is formed independently from the support plate and into a chipped configuration, the chipped mounting member being disposed outside of the switching section on the membrane switch member.

* * * * *